(12) United States Patent
Lee et al.

(10) Patent No.: US 12,711,487 B2
(45) Date of Patent: Aug. 18, 2026

(54) PAYMENT METHOD AND DEVICE USING ULTRA-WIDEBAND COMMUNICATION

(71) Applicant: Samsung Electronics Co., Ltd., Suwon-si (KR)

(72) Inventors: Jihye Lee, Suwon-si (KR); Sungkyu Cho, Suwon-si (KR); Kangjin Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 158 days.

(21) Appl. No.: 18/276,549

(22) PCT Filed: Feb. 10, 2022

(86) PCT No.: PCT/KR2022/002043

§ 371 (c)(1),
(2) Date: Aug. 9, 2023

(87) PCT Pub. No.: WO2022/173245

PCT Pub. Date: Aug. 18, 2022

(65) Prior Publication Data

US 2024/0086890 A1 Mar. 14, 2024

(30) Foreign Application Priority Data

Feb. 10, 2021 (KR) ........................ 10-2021-0019319

(51) Int. Cl.
*G06Q 20/32* (2012.01)
*G06Q 20/36* (2012.01)
*G06Q 20/38* (2012.01)

(52) U.S. Cl.
CPC ....... *G06Q 20/325* (2013.01); *G06Q 20/3674* (2013.01); *G06Q 20/3829* (2013.01); *G06Q 2220/00* (2013.01)

(58) Field of Classification Search
None
See application file for complete search history.

(56) References Cited

U.S. PATENT DOCUMENTS

2007/0123215 A1 5/2007 Wang et al.
2010/0191593 A1 7/2010 Wang et al.
(Continued)

FOREIGN PATENT DOCUMENTS

KR 10-2012-0106238 A 9/2012
KR 10-2015-0080952 A 7/2015
(Continued)

OTHER PUBLICATIONS

Amendment Enhanced ultra wide-band, Physical layers and associated randing techniques; Approved Jun. 4, 2020.
(Continued)

*Primary Examiner* — Patrick Mcatee
*Assistant Examiner* — Timothy Paul Sax
(74) *Attorney, Agent, or Firm* — Jefferson IP Law, LLP

(57) ABSTRACT

The present disclosure discloses a method for a UWB-based payment service. A method of a first electronic device using UWB communication, of the present disclosure, may comprise the operations of: receiving, from a second electronic device, an initiation message for UWB ranging, which includes a random number generated by means of the second electronic device, transmitting, to the second electronic device, a response message to the initiation message, which includes identification information about the first electronic device encrypted using a session key generated on the basis of the random number, receiving, from the second electronic device, a transaction information message including request type information indicating the type of request associated with a payment, and transmitting, to the second electronic
(Continued)

device, a payment information message including response data based on the request type information.

20 Claims, 12 Drawing Sheets

(56) References Cited

U.S. PATENT DOCUMENTS

2011/0291803 A1 12/2011 Bajic et al.
2012/0159612 A1 6/2012 Reisgies
2012/0330769 A1* 12/2012 Arceo ................ G06Q 20/4014 455/411
2013/0124421 A1* 5/2013 Deng ............... G06Q 20/40975 705/71
2017/0280410 A1* 9/2017 Luo ....................... H04W 60/04
2018/0253573 A1* 9/2018 Hart ...................... G07F 7/0873
2019/0098499 A1* 3/2019 Lerch ................. G06Q 20/3821
2020/0019725 A1 1/2020 Rule et al.
2020/0082370 A1 3/2020 Yang et al.
2020/0106877 A1* 4/2020 Ledvina ................ H04W 12/06
2021/0081912 A1* 3/2021 Park ...................... G07F 13/025
2021/0312424 A1* 10/2021 Lee .................... G06Q 20/3825
2022/0119001 A1* 4/2022 Schubert ............... G01S 5/0284
2023/0184916 A1* 6/2023 Pirch .................. H04B 17/3912 342/22
2023/0360020 A1* 11/2023 Nakatsugawa ......... G07F 7/088
2024/0112513 A1* 4/2024 Studerus ............ G07C 9/00309

FOREIGN PATENT DOCUMENTS

KR 10-2017-0027328 A 3/2017
KR 10-2020-0028827 A 3/2020

OTHER PUBLICATIONS

European Search Report dated Nov. 16, 2023, issued in European Application No. 22753005.2.
International Search Report with Written Opinion and English translation dated May 19, 2022; International Appln. No. PCT/KR2022/002043.
European Examination Report dated Mar. 2, 2026, issued in European Patent Application No. 22753005.2.

* cited by examiner

PAYMENT METHOD AND DEVICE USING ULTRA-WIDEBAND COMMUNICATION

CROSS-REFERENCE TO RELATED APPLICATION(S)

This application is a U.S. National Stage application under 35 U.S.C. § 371 of an International application number PCT/KR2022/002043, filed on Feb. 10, 2022, which is based on and claims priority of a Korean patent application number 10-2021-0019319, filed on Feb. 10, 2021, in the Korean Intellectual Property Office, the disclosure of which is incorporated by reference herein in its entirety.

TECHNICAL FIELD

The disclosure relates to UWB communication and, more specifically, to a payment method and device using UWB.

BACKGROUND ART

The Internet is evolving from the human-centered connection network by which humans create and consume information to the Internet of Things (IoT) network by which information is communicated and processed between things or other distributed components. Another arising technology is the Internet of Everything (IoE), which is a combination of the Big data processing technology and the IoT technology through, e.g., a connection with a cloud server. Implementing the IoT requires technical elements, such as sensing technology, a wired/wireless communication and network infrastructure, service interface and security technologies. A recent ongoing research for thing-to-thing connection is on techniques for sensor networking, machine-to-machine (M2M), or machine-type communication (MTC).

In the IoT environment may be offered intelligent Internet Technology (IT) services that collect and analyze the data generated by the things connected with one another to create human life a new value. The IoT may have various applications, such as the smart home, smart building, smart city, smart car or connected car, smart grid, health-care, or smart appliance industry, or state-of-art medical services, through conversion or integration of conventional information technology (IT) techniques and various industries.

As wireless communication systems evolve to provide various services, a need arises for a method for effectively providing such services. For example, it is possible to use a ranging technique for measuring the distance between electronic devices using ultra-wide band (UWB).

DETAILED DESCRIPTION OF THE INVENTION

Technical Problem

The disclosure provides a method for performing payment using UWB. The disclosure also provides a configuration of a UWB message that enables both batch payment and immediate payment. The disclosure also provides a definition of a key used for security in a payment process using UWB.

Technical Solution

A method of a first electronic device according to various embodiments of the disclosure may comprise receiving, from a second electronic device, an initiation message for UWB ranging including a random number generated by the second electronic device, transmitting, to the second electronic device, a response message to the initiation message including identification information of the first electronic device encrypted using a session key generated based on the random number, receiving, from the second electronic device, a transaction information message including request type information indicating a type of a request associated with payment, and transmitting, to the second electronic device, a payment information message including response data based on the request type information.

A method by a second electronic device using UWB communication, according to various embodiments of the disclosure, may comprise transmitting, to a first electronic device, an initiation message for UWB ranging including a random number generated by the second electronic device, receiving, from the first electronic device, a response message to the initiation message including identification information of the first electronic device encrypted using a session key generated based on the random number, transmitting, to the first electronic device, a transaction information message including request type information indicating a type of a request associated with payment, and receiving, from the first electronic device, a payment information message including response data based on the request type information.

A first electronic device using UWB communication, according to various embodiments of the disclosure, may comprise a transceiver and a controller connected to the transceiver and configured to receive, from a second electronic device, an initiation message for UWB ranging including a random number generated by the second electronic device, transmit, to the second electronic device, a response message to the initiation message including identification information of the first electronic device encrypted using a session key generated based on the random number, receive, from the second electronic device, a transaction information message including request type information indicating a type of a request associated with payment, and transmit, to the second electronic device, a payment information message including response data based on the request type information.

A second electronic device using UWB communication, according to various embodiments of the disclosure, may comprise a transceiver and a controller connected to the transceiver and configured to transmit, to a first electronic device, an initiation message for UWB ranging including a random number generated by the second electronic device, receive, from the first electronic device, a response message to the initiation message including identification information of the first electronic device encrypted using a session key generated based on the random number, transmit, to the first electronic device, a transaction information message including request type information indicating a type of a request associated with payment, and receive, from the first electronic device, a payment information message including response data based on the request type information.

Advantageous Effects

It is possible to enable both batch payment and immediate payment using a configuration of a UWB message of the disclosure. It is also possible to perform security processing in a payment process using UWB using a key defined in the disclosure.

MODE FOR CARRYING OUT THE INVENTION

Figure 1:
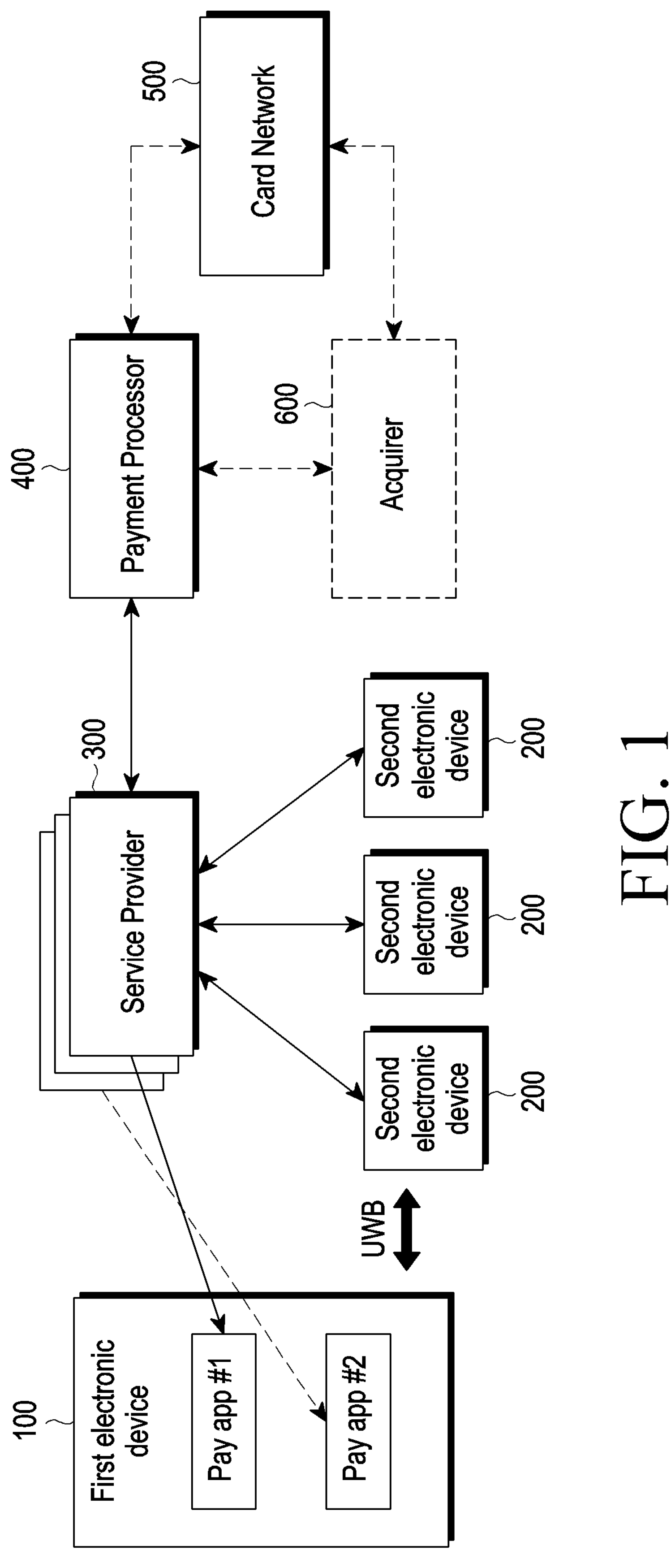
FIG. 1 illustrates a payment system using UWB according to an embodiment of the disclosure.

Hereinafter, embodiments of the disclosure are described in detail with reference to the accompanying drawings.

In describing embodiments, the description of technologies that are known in the art and are not directly related to the present invention is omitted. This is for further clarifying the gist of the present disclosure without making it unclear.

For the same reasons, some elements may be exaggerated or schematically shown. The size of each element does not necessarily reflects the real size of the element. The same reference numeral is used to refer to the same element throughout the drawings.

Advantages and features of the present disclosure, and methods for achieving the same may be understood through the embodiments to be described below taken in conjunction with the accompanying drawings. However, the present invention is not limited to the embodiments disclosed herein, and various changes may be made thereto. The embodiments disclosed herein are provided only to inform one of ordinary skilled in the art of the category of the present disclosure. The present invention is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including instruction means for performing the functions described in connection with a block (s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block (s) in each flowchart.

Further, each block may represent a module, segment, or part of a code including one or more executable instructions for executing a specified logical function(s). Further, it should also be noted that in some replacement embodiments, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, a 'unit' is not limited to software or hardware. A 'unit' may be configured in a storage medium that may be addressed or may be configured to execute one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. Functions provided within the components and the 'units' may be combined into smaller numbers of components and 'units' or further separated into additional components and 'units'. Further, the components and 'units' may be implemented to execute one or more CPUs in a device or secure multimedia card. According to embodiments of the disclosure, a " . . . unit" may include one or more processors.

As used herein, the term 'terminal' or 'device' may also be referred to as a mobile station (MS), user equipment (UE), user terminal (UT), terminal, wireless terminal, access terminal (AT), subscriber unit, subscriber station (SS), wireless device, wireless communication device, wireless transmit/receive unit (WTRU), mobile node, or mobile or may be referred to in other terms. Various embodiments of the terminal may include cellular phones, smart phones with wireless communication capabilities, personal digital assistants (PDAs) with wireless communication capabilities, wireless modems, portable computers with wireless communication capabilities, capturing/recording/shooting/filming devices, such as digital cameras, having wireless communication capabilities, game players with wireless communications capabilities, music storage and playback home appliances with wireless communications capabilities, Internet home appliances capable of wireless Internet access and browsing, or portable units or terminals incorporating combinations of those capabilities. Further, the terminal may include a machine to machine (M2M) terminal and a machine-type communication (MTC) terminal/device, but is not limited thereto. In the disclosure, the terminal may be referred to as an electronic device or simply as a device.

Hereinafter, the operational principle of the disclosure is described below with reference to the accompanying drawings. When determined to make the subject matter of the disclosure unnecessarily unclear, the detailed description of known functions or configurations may be skipped in describing embodiments of the disclosure. The terms as used herein are defined considering the functions in the present disclosure and may be replaced with other terms according to the intention or practice of the user or operator. Therefore, the terms should be defined based on the overall disclosure.

Hereinafter, embodiments of the present invention are described in detail with reference to the accompanying drawings. Further, although a communication system using UWB is described in connection with embodiments of the present invention, as an example, embodiments of the present invention may also apply to other payment systems with similar technical background or features. For example, a communication system using Bluetooth or ZigBee may be included therein. Further, embodiments of the present invention may be modified in such a range as not to significantly depart from the scope of the present invention under the determination by one of ordinary skill in the art and such modifications may be applicable to other communication systems.

When determined to make the subject matter of the present invention unclear, the detailed description of the known art or functions may be skipped. The terms as used herein are defined considering the functions in the present disclosure and may be replaced with other terms according to the intention or practice of the user or operator. Therefore, the terms should be defined based on the overall disclosure.

In general, wireless sensor network technology is largely divided into a wireless local area network (WLAN) technology and a wireless personal area network (WPAN) technology according to the recognition distance. In this case, WLAN is a technology based on IEEE 802.11 which enables access to the backbone network within a radius of about 100 m. WPAN is a technology based on IEEE 802.15 which includes Bluetooth, ZigBee, and ultra-wide band (UWB). A wireless network in which such a wireless network technology is implemented may include a plurality of electronic devices.

According to the definitions by the Federal Communications Commission (FCC), UWB may refer to a wireless communication technology that uses a bandwidth of 500 MHz or more or a bandwidth corresponding to a center frequency of 20% or more. UWB may mean a band itself to which UWB communication is applied. Hereinafter, a payment method is described based on a UWB communication scheme, but this is merely an example and various wireless communication technologies may be used in practice.

The terminology used herein is provided for a better understanding of the disclosure, and changes may be made thereto without departing from the technical spirit of the disclosure.

"Application dedicated file (ADF)" may be, e.g., a data structure that may host an application or application specific data.

"Application protocol data unit (APDU)" may be a command and a response used when communicating with a secure element (SE) (e.g., embedded SE) or application data structure.

"Application specific data" may be, e.g., an applet, a proprietary applet, or an equivalent implementation within a ranging device.

"Controller" may be a ranging device that defines and controls ranging control messages (RCM). In the disclosure, the ranging device may be, e.g., an enhanced ranging device (ERDEV) as defined in the IEEE Std 802.15.4z standard.

"Controlee" may be a ranging device using a ranging parameter in the RCM received from the controller.

"Dynamic STS" may be an operation mode in which the STS is confidential and never repeated during a ranging session. The STS may be managed by the secure component in this mode.

"Applet" may be an applet that implements an APDU interface running on a secure component and is identified by a well-defined application (applet) ID (AID). This applet may host the data needed for secure ranging. In an embodiment, the applet may be, e.g., a FiRa applet as defined in the FIRA CONSORTIUM COMMON SERVICE & MANAGEMENT LAYER (CSML) specifications.

"Ranging device" is a ranging device that may communicate with another ranging device using a pre-defined profile (e.g., a set of configuration parameters related to UWB and OOB used in the UWB-enabled door lock service) or a ranging device capable of supporting a pre-defined UWB ranging service for performing a ranging session with another ranging device. In this disclosure, the ranging device may be referred to as a UWB device or a UWB ranging device. In an embodiment, the ranging device may be, e.g., a FiRa device as defined in the FIRA CONSORTIUM CSML specification.

"Ranging data set (RDS)" may be data required to establish a UWB session whose confidentiality, authenticity, and integrity need to be protected. As an embodiment, the RDS may include a UWB session key.

"UWB-enabled application" may be an application using a Framework API for configuring an OOB Connector, a Secure Service, and/or a UWB service for a UWB session. In this disclosure, "UWB-enabled Application" may be abbreviated as an application. In an embodiment, the UWB-enabled application may be, e.g., a FiRa-enabled application defined in the FIRA CONSORTIUM CSML specification.

"Framework" may be, e.g., a collection of logical software components including an OOB connector, secure Service, and/or UWB service. In an embodiment, the framework may be, e.g., FiRa Framework as defined in the FIRA CONSORTIUM CSML specification.

"OOB Connector" may be a software component for establishing out-of-band (OOB) communication (e.g., BLE communication) between ranging devices. In an embodiment, the OOB connector may be, e.g., a FiRa OOB connector as defined in the FIRA CONSORTIUM CSML specification.

"Profile" may be a previously defined set of UWB and OOB configuration parameters. In an embodiment, the profile may be, e.g., a FiRa profile as defined in the FIRA CONSORTIUM CSML specification.

"Profile manager" may implement a profile available on the ranging device. In an embodiment, the profile manager may be, e.g., a FiRa profile manager as defined in the FIRA CONSORTIUM CSML specification.

"Smart ranging device" may be a ranging device (e.g., physical access reader) capable of hosting one or more UWB-enabled applications and implementing the framework or a ranging device that implements a specific screen application provided by the manufacturer. The smart ranging device may be a ranging device capable of installing multiple UWB-enabled applications to support a UWB ranging-based service to perform a ranging session with another ranging device or smart ranging device. In an embodiment, the smart ranging device may be, e.g., a FiRa smart device as defined in the FIRA CONSORTIUM CSML specification.

"Global Dedicated File (GDF)" may be a root level of application specific data including data required to establish a USB session. The application specific data may be, e.g., an applet, a proprietary applet, or an equivalent implementation within a ranging device.

"Framework API" may be an API used by a UWB-enabled Application to communicate with the Framework.

"Initiator" may be a Ranging Device that initiates a ranging exchange.

"Object identifier (OID)" may be an identifier of the ADF in the application data structure or a unique ID for identifying a service provider SP.

"Out-of-band (OOB)" may be data communication that does not use UWB as an underlying wireless technology.

"Responder" may be a ranging device that responds to the Initiator in a ranging exchange.

"Scrambled timestamp sequence (STS)" may be a ciphered sequence for increasing the integrity and accuracy of ranging measurement timestamps.

"Secure channel" may be a data channel that prevents overhearing and tampering.

"Secure component" may be a component that interfaces with UWBS for the purpose of providing RDS to UWBS, e.g., when dynamic STS is used. It may also host UWB-enabled application data.

"Secure element (SE)" may be a tamper-resistant secure hardware component that may be used as a Secure Component in the Ranging Device.

"Secure service" may be a component for interfacing with the secure component of the system, such as a trusted execution environment (TEE) or secure element.

"Static STS" is an operation mode in which STS is repeated during a session, and does not need to be managed by the secure component.

"SUS applet" may be an applet on the secure component operating as an endpoint for the secure channel between secure components, such as UWBS and SE.

"UWB Service" may be an implementation-specific software component that provides access to the UWBS.

It may be considered that the "UWB session" is established when the controller and controlee (s) may start UWB ranging. The UWB session may be a period from when the controller and the controlee start communication through UWB until the communication stops. A UWB Session may include ranging, data transfer, or both ranging and data transfer.

"UWB session ID" may be an ID (e.g., an integer) for identifying the UWB session.

"UWB session key" may be a key used to protect the UWB Session. In this disclosure, the UWB session key may be a UWB ranging session key (URSK), and may be denoted as a session key.

"UWB Subsystem (UWBS)" may be a hardware component implementing the UWB PHY and MAC specifications. The UWBS may have an interface to the FiRa framework where the UCI logical interface layer has been implemented and an interface for the secure component to search for the RDS. In an embodiment, the UWB PHY and MAC specifications may be, e.g., the FiRa CONSORTIUM PHY and MAC specifications.

Hereinafter, various embodiments of the disclosure are described with reference to the accompanying drawings.

FIG. 1 illustrates a payment system using UWB according to an embodiment of the disclosure.

Referring to FIG. 1, a payment system using UWB (UWB payment system) may include a first electronic device(s) 100, a second electronic device(s) 200, a service provider(s) 300, and/or a payment processor(s) 400. The payment processor 400 may be connected to a card network 500 and/or an acquirer 500. The acquirer 500 is an optional component and may serve to acquire slips and process payment on behalf of affiliated stores.

The first electronic device 100 may be an electronic device (terminal) that performs UWB communication with the second electronic device 200. For example, the first electronic device 100 may be an electronic device serving as a responder that transmits a response message in response to an initiation message for UWB ranging received from the second electronic device 200. In an embodiment, the first electronic device 100 may be a mobile device (e.g., a mobile phone, a smart watch, a smart bracelet, etc.) of the user using a payment-related service provided at the place of business of the service provider 300. In an embodiment, the first electronic device 100 may include at least one payment application provided by at least one service provider 300. For example, the first electronic device 100 may include a first payment application (pay app #1) provided by the first service provider 300 and/or a second payment application (pay app #2) provided by the first service provider 300 or the second service provider 300.

The second electronic device 200 may be an electronic device (terminal) that performs UWB communication with the first electronic device 100. For example, the second electronic device 200 may be an electronic device serving as an initiator that transmits an initiation message for UWB ranging to the first electronic device 100. In an embodiment, the second electronic device 200 may be a payment device (e.g., a point of sales (PoS) device) installed in the place of business (business place) of the service provider 300 and/or an electronic device (gate device) that identifies entry/exit of the user through UWB ranging at the gate.

The service provider 300 may be the owner for a specific payment application provided to the first electronic device 100 and may be an entity (e.g., a server) responsible for managing the second electronic device 200. In the disclosure, the service provider 300 may also be referred to as a service provider device, a service provider server, or a service provider backend server.

The payment processor 400 may be an entity (e.g., a server) that receives payment information about the second electronic device 200 and, when there is no payment information, transfers payment information to the card network 500. Further, the payment processor 400 may be responsible for operating the second electronic device 200.

In FIG. 1, the service provider 300 and the payment processor 400 are shown as separate entities, but this merely logically separates the two components. Accordingly, the service provider 300 device and the payment processor 400 may be configured as a single entity that performs the above-described functions of the service provider 300 device and the payment processor 400 together. Further, the payment processor 400 and the acquirer 600 may also be configured as a single entity.

Figure 2A:
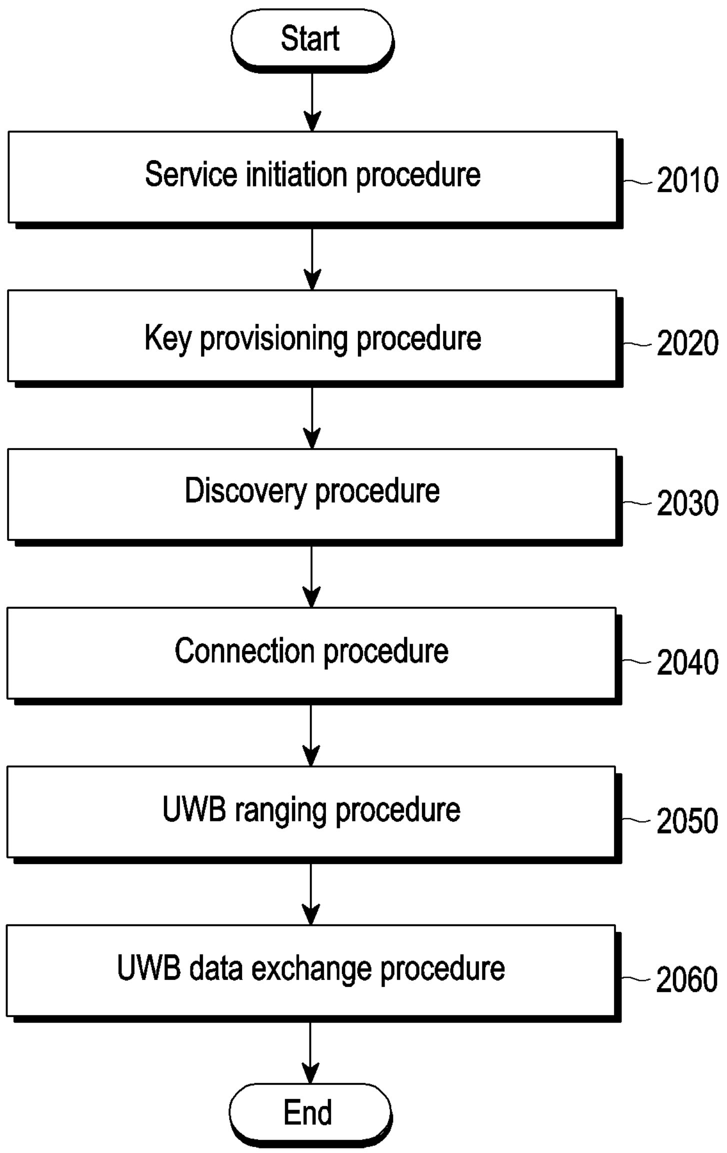
FIG. 2A illustrates a method for providing a UWB-related service according to an embodiment of the disclosure.

FIG. 2A illustrates a method for providing a UWB-related service according to an embodiment of the disclosure.

Referring to FIG. 2A, a method for providing a UWB-related service (a method for providing a UWB service) may include a service initiation procedure 2010, a key provisioning procedure 2020, a discovery procedure 2030, a connection procedure 2040, a UWB ranging procedure 2050, and/or a UWB data exchange procedure 2060. Meanwhile, according to an embodiment, some procedures may be omitted or additional procedures may be added, and the procedures may be performed in a different order than that shown in FIG. 2A. For example, the key provisioning procedure 2030, the discovery procedure 2030 and connection procedure 2040, or the discovery procedure 2030 and connection procedure 2040 may be omitted.

In an embodiment, the UWB-related service may be a payment service using UWB ranging.

Referring to FIG. 2A, the service initiation procedure 2010 is a procedure for initiating a UWB-related service, and may include, e.g., an operation for determining a BLE profile and/or a UWB profile for providing a UWB-related service.

The key provisioning procedure 2020 may be a procedure for issuing and distributing security information (e.g., keys or certificate) to provide secured UWB-related services. In an embodiment, the security information may be issued and distributed by a service provider providing a UWB-related service (or application).

The discovery procedure 2030 is a procedure for discovering a UWB device, and may be performed through out-of-band (OOB) communication (e.g., BLE communication) or in-band communication (e.g., UWB communication).

The connection procedure 2040 may be a procedure for establishing a UWB channel or session by exchanging parameters for establishing a channel or session for UWB communication.

The UWB ranging procedure 2050 may be a procedure for measuring a position/distance between electronic devices according to a UWB communication scheme.

The UWB ranging procedure 2050 includes an operation in which the second electronic device transmits an initiation message (e.g., ranging initiation message) to the first electronic device and an operation in which the first electronic device receives a response message (e.g., a ranging response message) corresponding to the initiation message from the second electronic device. In an embodiment, the ranging initiation message may be a first message transmitted to initiate ranging exchange.

For a detailed description of the above-described UWB ranging procedure 2050, reference the descriptions of IEEE Std 802.15.4z-2020 and FIRA CONSORTIUM UWB MAC TECHNICAL REQUIREMENTS.

The UWB data exchange procedure 2060 may be a procedure for exchanging information/data for a UWB-related service between electronic devices by a UWB communication scheme or another communication scheme. In an embodiment, the UWB data exchange procedure 2060 may exchange information/data through a transaction information message and a payment information message, which are described below.

Figure 2B:
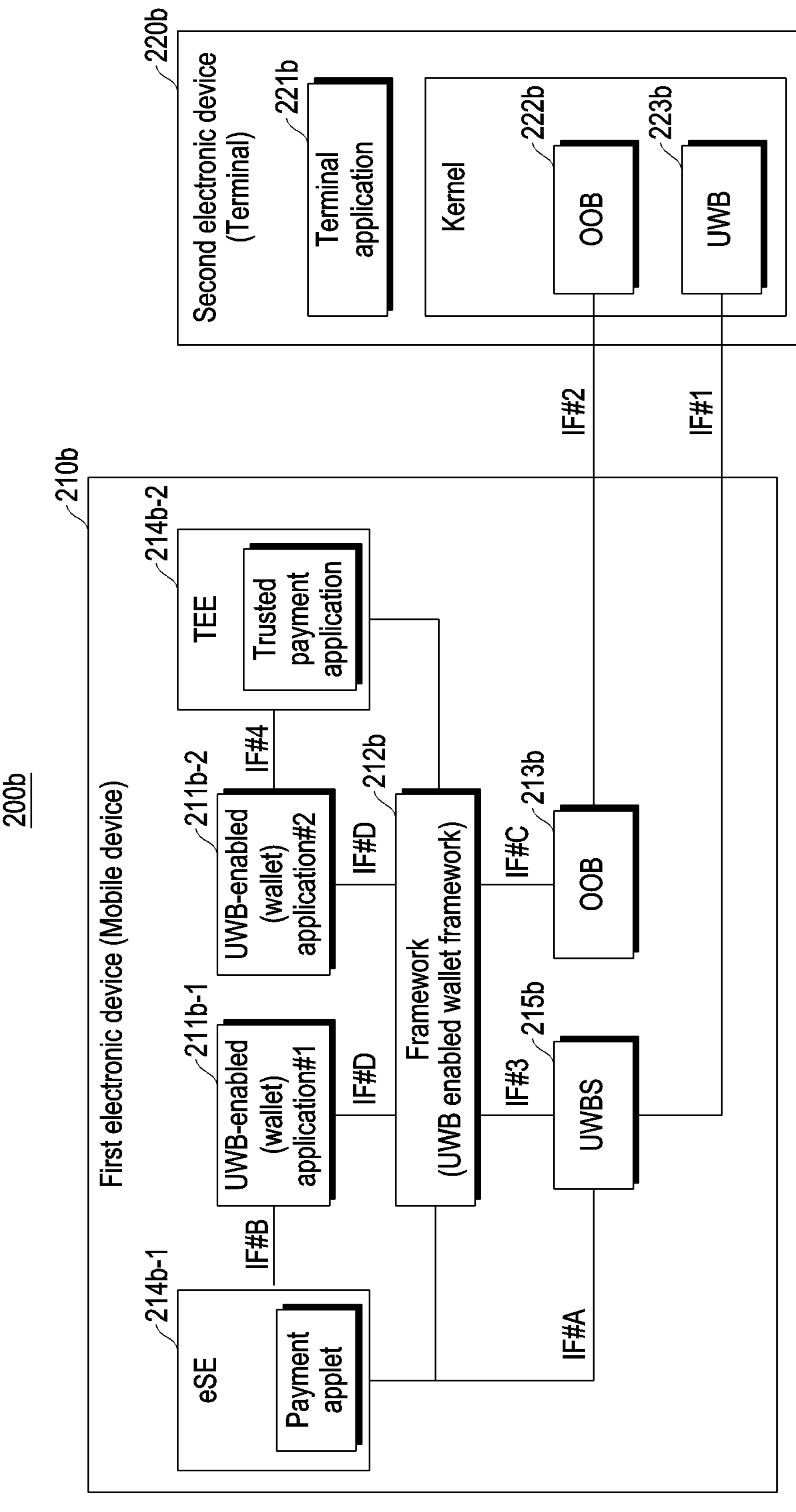
FIG. 2B is a view illustrating an example configuration of a communication system including an electronic device supporting a UWB-based payment service according to an embodiment of the disclosure.

FIG. 2B is a view illustrating an example configuration of a communication system including an electronic device supporting a UWB-based payment service.

The embodiment of FIG. 2B may be an example of a system including the first electronic device 100 and the second electronic device 200 of FIG. 1. For example, the first electronic device 210*b* of FIG. 2B may be an example of the first electronic device 100 of FIG. 1. The second electronic device 220*b* of FIG. 2B may be an example of the second electronic device 200 of FIG. 1.

Referring to FIG. 2B, a communication system 200*b* providing a UWB-based payment service may include a first electronic device (first UWB device) 210*b* and a second electronic device (second UWB device) 220*b*, In FIG. 2B, the first electronic device may be referred to as a first UWB device, and the second electronic device may be referred to as a second UWB device.

The first electronic device 210*b* may be the user's electronic device (e.g., the user's mobile device) for a UWB-based payment service. The first electronic device 210*b* may include at least one UWB enabled wallet application (UWB enabled application) 211*b*-1 and 211*b*-2, a UWB enabled wallet framework (framework) 212*b*, an OOB component 213*b*, at least one secure component 214*b*-1 and 214*b*-2, and/or a UWBS 215*b*. The description of each component may refer to the description of FIG. 2A.

Meanwhile, in the embodiment of FIG. 2B, for convenience of description, it is described that the UWB enabled application corresponds to the UWB enabled wallet application and the framework corresponds to the UWB enabled wallet framework, but embodiments are not limited thereto, and various UWB enabled applications and frameworks for providing various types of services may be implemented. In FIG. 2B, the UWB enabled wallet application may be referred to as a UWB enabled application, and the UWB enabled wallet framework may be referred to as a framework.

(1) The UWB enabled applications 211*b*-1 and 211*b*-2 may support at least one of the following features.

- hosts applet for UWB-based payment in SE (e.g., eSE) or trusted payment (trusted payment application) for UWB-based payment in TEE
- if requested by the framework, provides arrangement information about anchors for estimating the location of the first electronic device and a UWB block structure
- communication with second electronic device and back-end server for personalization of payment applet or trusted payment application (2) The framework 212*b* may support at least one of the following features.

- estimates the location of the first electronic device
- implements UCI commands
- UWB enabled application provides a set of APIs for accessing UWBS and OOB components (3) The OOB component 213*b* may support the following features.

- implements OOB connection operation (e.g., BLE connection operation)

(4) The trusted payment application 211*b*-2 may be included in the TEE and may support at least one of the following features.

- supports TEE client API
- implements trusted application
- implements the secure channel protocol to communicate with the second electronic device in a secure manner
- hosts payment credentials and cryptographic keys for secure channels
- hosts important information (e.g., card information) for supporting UWB-based payment service (5) The payment applet 211*b*-1 may be included in the SE and may support at least one of the following features.

- supports APDU
- implements the secure channel protocol to communicate with the second electronic device in a secure manner
- hosts payment credentials and cryptographic keys for secure channels
- hosts important information (e.g., card information) for supporting UWB-based payment service Each component of the first electronic device 210*b* may communicate with another component through a predefined interface IF. Hereinafter, each interface is described.

IF #1: An interface between the UWBS 215*b* of the first electronic device 210*b* and the UWBS (e.g., the UWBS 223*b* of the second electronic device 220*b*) of another electronic device. IF #1 may be used to exchange UWB messages and/or payment transactions.

IF #2: An interface between the OOB component 213*b* of the first electronic device 210*b* and an OOB component (e.g., the OOB component 222*b* of the second electronic device 220*b*) of another electronic device. IF #2 may be used to exchange OOB messages.

IF #3: An interface between framework 212*b* and UWBS 215*b*. IF #3 may be used to exchange UCI messages. For example, IF #3 may be used to exchange a UCI message for establishing a secure channel between the trusted payment application 211*b*-2 and the UWBS 215*b*.

IF #4: An interface between UWB enabled application 211*b*-2 and trusted payment application 211*b*-2 in TEE. IF #4 may be used to exchange TEE commands through the TEE Client API. For example, IF #4 may be used to exchange TEE commands for establishing a secure channel between the trusted payment application 211*b*-2 and the UWBS 215*b*.

IF #A: An interface between UWB enabled applications 211*b*-1 and 211*b*-2 and UWBS 215*b*. IF #A may be, e.g., a SUS external API.

IF #B: An interface between UWB enabled application 211*b*-2 and payment applet 214*b*-1 in SE (eSE). IF #B may be used to exchange APDUs through OMAPI. For example, IF #B may be used to exchange an APDU for establishing a secure channel between eSE and UWBS.

IF #C: An interface between OOB component 213*b* and framework 212*b* or UWB enabled applications 211*b*-1 and 211*b*-2.

IF #D: An interface between UWB enabled applications 211*b*-1 and 211*b*-2 and framework 212*b*. IF #D may be a framework API (API) provided by the framework 212*b*.

The second electronic device 220*b* may be an electronic device (e.g., a point of service (PoS) terminal of the proprietor) of an operator for a UWB-based payment service. The second electronic device 220*b* may include a terminal application 221*b*, an OOB component 222*b*, and/or a UWBS 223*b*.

Figure 3:
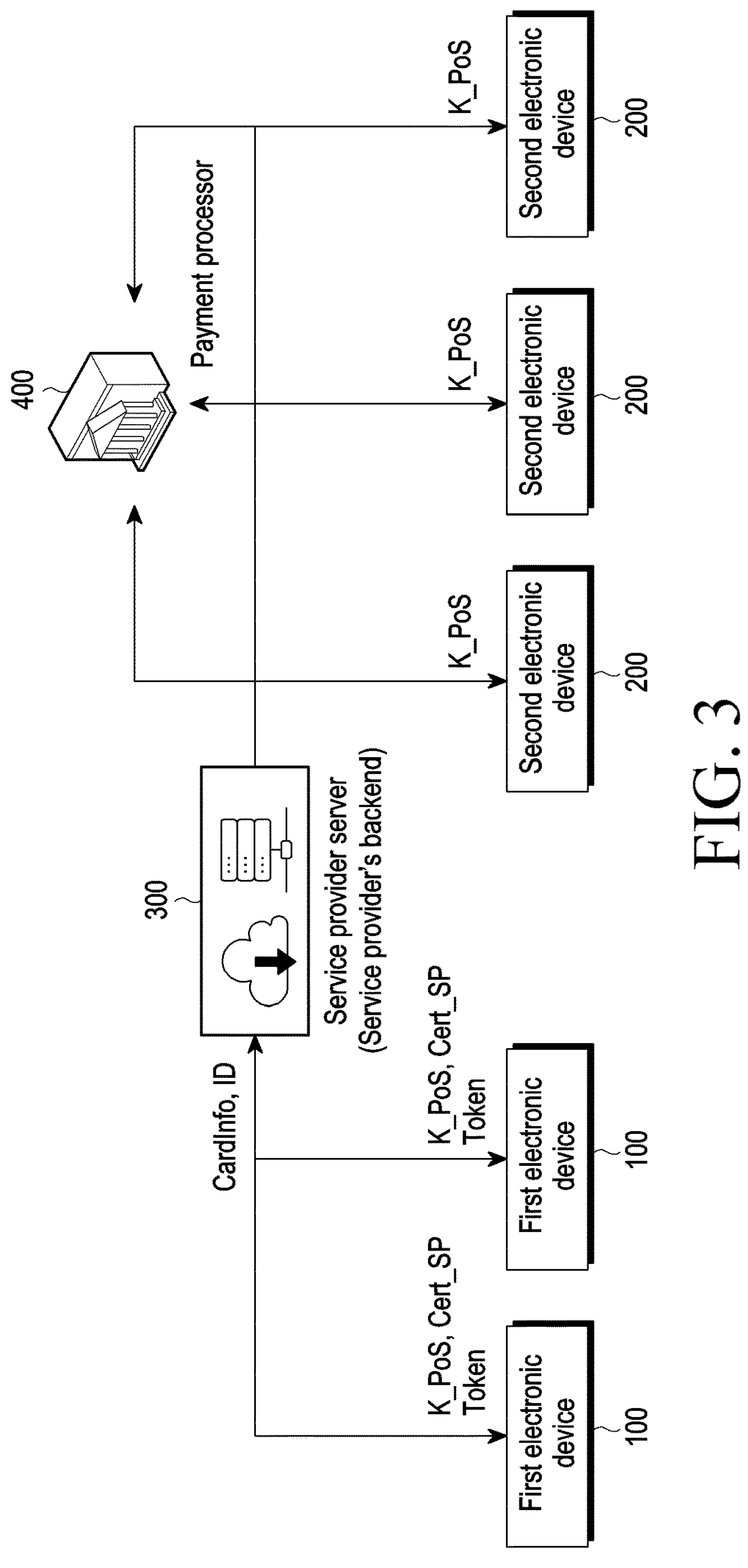
FIG. 3 illustrates a method for providing security-related information for a payment service using UWB according to an embodiment of the disclosure.

FIG. 3 illustrates a method for providing security-related information for a payment service using UWB according to an embodiment of the disclosure.

In the embodiment of FIG. 3, security-related information may include at least one of a security key, a certificate, and a token. The embodiment of FIG. 3 may be part of the key provisioning procedure of FIGS. 2A and 2B, but is not limited thereto. For example, some keys (e.g., K_Pos) may be distributed by the service provider through the key provisioning procedure, but other keys (e.g., session key) may be generated in, e.g., a UWB ranging-related operation process. For example, the session key (payment session key) to be described below may be generated in a UWB ranging process based on an initiation message and a response message.

Table 1 below provides examples and descriptions of keys used for the payment service of the disclosure.

TABLE 1

| Keys (Type) | Type | Description | Etc. |
|---|---|---|---|
| PoS authentication key (K_PoS) | Symmetric (Mobile-PoS) | key distributed by service provider or payment processor distributed to PoS through backend infrastructure of SP or PP, and distributed to mobile device during app installation or registration | downloaded during service registration (Enable Payment) |
| Session Key Encryption Key (Pub_SP from Cert_SP) | Asymmetric (Service Provider) | public key generated by SP or PP and distributed to mobile device (distributed in the form of a certificate)<br>aims to protect the session key for protecting user ID and protects it in electronic envelope manner | private key (Priv_SP) paired with the corresponding key is stored only in SP or PP<br>downloaded during service registration (Enable Payment) |
| Payment Session Key | Symmetric (Mobile-PoS) | session key generated based on random transmitted from PoS and random generated by mobile device<br>aims to protect user ID encrypted with Pub_SP and transmitted to SP or PP | generated during operation |
| Token Encryption Key (K_Token) | Symmetric (SP-PoS) | key for encrypting token by service provider | key distributable to PoS |
| payMobile | Asymmetric (Payment) | signing key for ensuring integrity of transaction/payment information<br>purpose of signing/verifying elements of payment information | signing key previously given through, e.g., EMV (SP independent) |

TABLE 1-continued

| Keys (Type) | Type | Description | Etc. |
|---|---|---|---|
| payPoS | Asymmetric (Payment) | signing key for ensuring integrity of transaction/payment information purpose of signing/verifying elements of transaction information | signing key previously given through, e.g., EMV (SP independent) |

Referring to Table 1, the PoS authentication key (K_PoS) may be a key used to authenticate (or identify) the second electronic device 200 (e.g., PoS device) performing a buying process. In the disclosure, the PoS authentication key (K_PoS) may be referred to as an authentication key or a second electronic device authentication key.

In an embodiment, the authentication key may be a symmetric key that is issued by the service provider 300 or payment processor 400 and provided to the first electronic device 100 (e.g., the user's mobile device) and the second electronic device 200. For example, the authentication key may be distributed to the first electronic device 100 during a process of installing or registering the payment application. The authentication key may be distributed to the second electronic device 200 through the backend infra (server) of the service provider 300 or the payment processor 400.

In another embodiment, together with or instead of the PoS authentication key (K_PoS), the certificate and signature may be used to authenticate (or identify) the second electronic device 200 (e.g., the PoS device). For example, a certificate and signature in the form of "Random||Cert PoS (or, Cert_SP)||SignedRandom" may be used. Here, Random may mean the random number, Cert PoS may mean the certificate of the second electronic device 200 (e.g., a PoS device), Cert_SP may mean the certificate of the service provider 300, and SignedRandom may mean the signed random number. In an embodiment, the certificate and signature may be issued by the service provider 300 or the payment processor 400 and provided to the first electronic device 100 and the second electronic device 200.

The Session Key Encryption Key (Pub_SP) may be a key used to encrypt a session key (payment session key) for protecting identification information (e.g., ID) about the user of the first electronic device 100. In an embodiment, the session key encryption key may be a public key that is obtained from the certificate (Cert_SP) generated (issued) by the service provider 300 or the payment processor 400 and provided to the first electronic device 100.

The payment session key may be a key used to protect user identification information (e.g., ID) about the first electronic device 100. In an embodiment, the payment session key may be a session key generated based on a random value transmitted by the second electronic device 200 and a random value generated by the first electronic device 100. This is described below with reference to FIG. 7. In an embodiment, the payment session key may be encrypted with a session key encryption key (Pub_SP) and transmitted to the service provider 300 or the payment processor 400. In the disclosure, the payment session key may be abbreviated as a session key.

Token Encryption Key (K_Token) may be a key for encrypting a token. In an embodiment, the token encryption key may be provided to the service provider 300 and/or the second electronic device 200. In the disclosure, a token is described as an example of the payment means used for processing payment instead of card information (e.g., credit card information), but this is merely an example, and other payment means that have the same or similar characteristics to those of the token described herein may be used in various embodiments of the disclosure.

payMobile may be a signing key to ensure integrity of transaction/payment information. In an embodiment, payMobile may be used to sign/verify elements of payment information.

payPoS may be a signing key to ensure integrity of transaction/payment information. In an embodiment, payPoS may be used to sign/verify elements of transaction information.

An example method for providing security-related information through a registration procedure for the user and card for a UWB-related payment service is described below with reference to FIG. 3.

Referring to FIG. 3, the user's first electronic device 100 may transmit the user's card information (CardInfo) and the user's ID to the service provider 300. For example, the first electronic device 100 (or the user of the first electronic device 100) may transmit its own card information and ID to the backend infrastructure (server) of the service provider 300. In an embodiment, a timestamp and/or additional information may be sent along with the card information and ID.

The service provider 300 or payment processor 400 may generate a token based on the user's card information and ID received from the user's first electronic device 100, and transmit the generated token to the first electronic device 100. The token may be used instead of card information in the payment process.

In an embodiment, the token may be generated according to "Token=Enc (ID||timestamp||CardInfo|| . . . )||MAC (Enc (ID||timestamp||CardInfo|| . . . ))". For example, the token may be generated by generating a first value (Enc (ID||timestamp||CardInfo|| . . . )) by encrypting the value obtained by concatenating (including) the user's ID, card information, and/or timestamp, generating a second value (MAC (Enc (ID||timestamp||CardInfo|| . . . ))) by applying a message authentication code (MAC) function to the first value, and concatenating (including) the first value and the second value.

In an embodiment, the key value used to generate the token may not be transferred to the user.

Further, the service provider 300 or the payment processor 400 may generate an authentication key (K_PoS) and transmit it to the first electronic device 100 and/or the second electronic device 200.

Further, the service provider 300 or the payment processor 400 may transmit the certificate (Cert_SP) of the service provider 300 to the first electronic device 100. The certificate (Cert_SP) may be used to derive the above-mentioned session key encryption key (Pub_SP).

Figure 4:
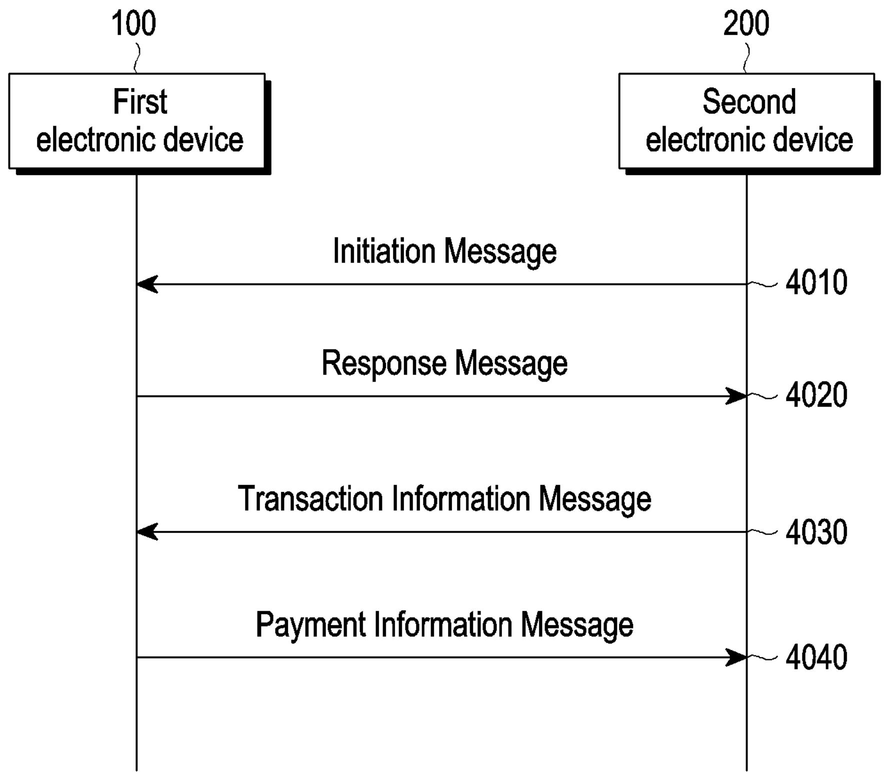
FIG. 4 illustrates a method for providing a payment service using UWB according to an embodiment of the disclosure.

FIG. 4 illustrates a method for providing a payment service using UWB according to an embodiment of the disclosure.

In the embodiment of FIG. 4, the first electronic device 100 and the second electronic device 200 correspond to devices capable of UWB communication. For example, the first electronic device 100 and the second electronic device 200 may be devices implemented according to a protocol stack including a MAC layer and a PHY layer specified by "IEEE 802.15.4 standard" and "FiRa consortium UWB technical standard". For example, the first electronic device 100 and/or the second electronic device 200 may be a UWB device (e.g., an enhanced ranging device (ERDEV) defined in IEEE 802.15.4z or FiRa device defined in FiRa) that provides a payment service (application) through UWB communication.

In the disclosure, the UWB message (e.g., an initiation message, a response message, a transaction information message, and a payment information message) may have a MAC frame structure including a MAC header, a MAC payload, and a MAC footer.

In an embodiment, the MAC header may include a Frame Control field, a Destination Address field, a Source Address field, an Auxiliary Security Header field, and/or at least one Header IE field. According to an embodiment, some fields may not be included in the MAC header. The Destination Address field may indicate the address of the recipient of the frame. The Source Address field may indicate the address of the originator of the frame.

In an embodiment, the MAC payload may include at least one Payload IE field.

In an embodiment, the MAC footer may include an FCS field. The FCS field may include a 16-bit CRC or a 32-bit CRC.

<Operation 4010 and Initiation Message>

Referring to FIG. 4, in operation 4010, the second electronic device 200 may transmit an initiation message for UWB ranging to the first electronic device 100. In an embodiment, the initiation message may include identification information (e.g., ID) about the second electronic device 200.

In an embodiment, the initiation message may be a ranging initiation message (UWB message/RFRAME) specified in the "IEEE 802.15.4z standard" and the "UWB MAC standard of the FiRa consortium".

In an embodiment, the initiation message may include a header information element (IE) and/or a payload IE. Table 2 below shows an example of the payload information element (IE) of the initiation message.

TABLE 2

| | Parameter | Size (bits) | Notes |
|---|---|---|---|
| | Length | 11 | Size of Content field |
| | Group ID | 4 | 2 = Vendor Specific Nested IE |
| | Type | 1 | 1 = Payload IE |
| Content | Vendor OUI | 24 | TBD = Samsung OUI |
| | UWB Message ID | 4 | TBD = Initiation Message |
| | Contention Window Size Presence | 1 | 0: No Contention Window Size field<br>1: Contention Window Size field is present |
| | Nonce presence | 1 | 0: No 1: Yes |
| | OID presence | 1 | 0: No 1: Yes |
| | Reserved | 1 | Reserved for future usage |
| | Nonce(random) | 128 | Random number of PoS or Gate |
| | Hnonce | 0/128 | HMAC/CMAC (K_PoS, random) |
| | OID | 0/160 | Object ID of a particular certificate which could be downloaded via OOB |
| | Contention Window Size | 0/8 | Time duration of contention window (unit is ms) |

Referring to Table 2, the initiation message (or the payload IE of the initiation message) may include a length field (information), a group ID field (information), a type field (information), and/or a content field (information). In an embodiment, the content field may include a vendor organizationally unique identifier (OUI) field (information), a UWB message ID field (information), a contention window size presence field (information), a nonce presence field (information), an object ID (OID) presence field (information), a nonce field (information), an Hnonce field (information), an OID field (information), and/or a contention window size field (information). Each field is described below.

The length field indicates the size (length) of the content field.

The group ID field indicates the type of the corresponding IE. For example, the group ID field may be set to a value (e.g., 2) indicating the vendor specific nested IE.

The type field indicates the type of the corresponding IE. For example, in the type field, the type of IE may be set to a value indicating the payload IE (e.g., 1).

The vendor OUI field indicates the vendor's OUI. The vendor OUI field may be, e.g., a field including a unique value of the vendor defining a message to ensure the uniqueness of the defined messages based on the IEEE standard. For example, the vendor OUI field may be set to a value indicating Samsung OUI and/or FiRa OUI.

The UWB message ID field may identify the UWB message. For example, in the case of the initiation message, the UWB message ID field may be set to a value indicating that the UWB message is the initiation message.

The contention window size presence field indicates whether the contention window size field is present. For example, when the contention window size field is not present, the contention window size presence field may be set to a first value (e.g., 0). Alternatively, when the contention window size field is present, the contention window size presence field may be set to a second value (e.g., 1).

The nonce field may indicate a random number (e.g., nonce) of the second electronic device 200 (e.g., a gate device or a PoS device) transmitting the initiation message. In an embodiment, the random number may be used to generate a session key. In an embodiment, the nonce may be a one-time used random number.

The nonce presence field may be a field (flag) indicating whether the Hnounce field is included (or present) in the initiation message. The Hnounce field may indicate a hashed nonce (Hnonce) for authenticating the nonce indicated by the nonce field. In an embodiment, the Hnonce may be generated based on the nonce and the authentication key (e.g., K_PoS) using a message authentication code function (e.g., HMAC or CMAC function). For example, the Hnonce may be generated according to "HMAC/CMAC (K_PoS, random)". In other words, the Hnonce may be generated by applying an HMAC or CMAC function to two parameters (K_Pos, random). As such, according to an embodiment, the Hnonce value may be generated for nonce authentication, and the Hnonce value may be transmitted through the Hnonce field. In this case, whether the Hnonce field is present may be signaled through the nonce presence field.

In an embodiment, the nonce presence field may be set to one of a first value (e.g., 0) indicating the absence of the Hnounce field or a second value (e.g., 1) indicating the presence of the Hnounce field. For example, when the value of the nonce presence field is set to the first value (e.g., 0), the nonce presence field may indicate that the Hnounce field is not included in the initiation message. In other words, the nonce presence field set to the first value may indicate that the Hnounce field is not present in the initiation message. Or, when the value of the nonce presence field is set to the second value (e.g., 1), the nonce presence field may indicate that the Hnounce field is included in the initiation message. In other words, the nonce presence field set to the second value may indicate that the Hnounce field is present in the initiation message. In the disclosure, the Hnounce field may be referred to as a message authentication code (MAC) field.

The initiation message may include an OID presence field. The OID presence field may be a field (flag) indicating whether the OID field is included (or present) in the initiation message. The OID field may indicate the object ID of a specific certificate that may be downloaded (or obtained) through, e.g., OOB. As such, according to an embodiment, a specific certificate provided by the service provider may be used for authentication of the nonce instead of the Hnonce generated based on HMAC/CMAC. In this case, the certificate may be downloaded from the backend server of the service provider by using the OID of the certificate. In this case, the second electronic device 200 may include the OID field in the initiation message instead of the Hnonce field. In this case, whether the OID field is present may be signaled through the OID presence field.

In an embodiment, the OID presence field may be set to one of a first value (e.g., 0) indicating the absence of the OID field or a second value (e.g., 1) indicating the presence of the OID field. For example, when the value of the OID presence field is set to the first value, the OID presence field may indicate that the OID field is not included in the initiation message. In other words, the OID presence field set to the first value may indicate that the OID field is not present in the initiation message. Or, when the value of the OID presence field is set to the second value, the OID presence field may indicate that the OID field is included in the initiation message. In other words, the OID presence field set to the second value may indicate that the OID field is present in the initiation message.

The contention window size field indicates the time duration of the contention window. For example, the contention window size field may indicate the duration of the contention window in the unit of ms. For example, the competition window size field indicates the number/range of ranging slots in which a receiving device (e.g., the first electronic device 100) may transmit a response message to a transmitting device (e.g., the second electronic device 200). In an embodiment, the value of the competition window size field may be different for each ranging round.

As an embodiment, the contention window size field may be included in the initiation message when the ranging mode of UWB ranging is a contention-based ranging mode. When the contention window size field is included in the initiation message, the first electronic device 100 may perform contention-based ranging (contention ranging) by transmitting a response message within the period of the contention window indicated by the contention window size field (e.g., transmitting a response message in any slot in the contention window period).

In the disclosure, the period of the contention window may be referred to as a contention period or a contention access period, and the contention window size field may be referred to as a contention period size field.

<Operation 4020 and Response Message>

In operation 4020, the first electronic device 100 may transmit a response message to the initiation message for UWB ranging to the second electronic device 200. In an embodiment, the response message may include identification information about the first electronic device 100 (e.g., user ID of the first electronic device 100).

In an embodiment, the response message may be a ranging response message (UWB message/RFRAME) specified in the "IEEE 802.15.4z standard" and the "UWB MAC standard of the FiRa consortium".

In an embodiment, the response message may include a header information element (IE) and/or a payload IE. Table 3 below shows an example of the payload IE of the response message.

TABLE 3

| | Parameter | Size (bits) | Notes |
|---|---|---|---|
| | Length | 11 | Size of Content field |
| | Group ID | 4 | 2 = Vendor Specific Nested IE |
| | Type | 1 | 1 = Payload IE |
| Content | Vendor OUI | 24 | TBD = Samsung OUI |
| | UWB Message ID | 4 | TBD = Response Message |
| | Reserved | 4 | Reserved for future usage |
| | Encrypted UserID | 2400 | Enc(Key_User, Rnd_User\|\|ID_User) \|\| PubEnc(Key_User) |

Referring to Table 3, the response message (or the payload IE of the response message) may include a length field (information), a group ID field (information), a type field (information), and/or a content field (information). In an embodiment, the content field may include a vendor OUI field (information), a UWB message ID field (information), and/or an encrypted userID field (information). Each field is described below.

The length field indicates the size (length) of the content field.

The group ID field indicates the type of the corresponding IE. For example, the group ID field may be set to a value (e.g., 2) indicating the vendor specific nested IE.

The type field indicates the type of the corresponding IE. For example, in the type field, the type of IE may be set to a value indicating the payload IE (e.g., 1).

The vendor OUI field indicates the vendor's OUI. The vendor OUI field may be, e.g., a field including a unique value of the vendor defining a message to ensure the uniqueness of the defined messages based on the IEEE standard. For example, the vendor OUI field may be set to a value indicating Samsung OUI and/or FiRa OUI.

The UWB message ID field may identify the UWB message. For example, in the case of the response message, the UWB message ID field may be set to a value indicating that the UWB message is the response message.

The encrypted userID field (encrypted user ID field) may indicate an encrypted user ID. In an embodiment, the encrypted userID field may include encrypted data of the user ID (ID_User) and the user's random value (Rnd_User). In an embodiment, the user ID may be encrypted by the symmetric key (Key_User). The symmetric key may be encrypted using the RSA algorithm by the public key of the second electronic device 200 (e.g., PoS device). For example, the encrypted user ID may be generated according to "Enc(Key_User, Rnd_User||ID_User)||PubEnc (Key_User)". For example, the encrypted user ID may be a value obtained by concatenating (including) a first value generated by applying an encryption function (Enc) using the value obtained by concatenating (including) the user's symmetric key (Key_User) and the user's random value (Rnd_User) and the user ID (ID_User), as a parameter, and a second value obtained by encrypting the symmetric key (Key_User)

with the public key. In the disclosure, the user's random value (Rnd_User) may be referred to as UserChallenge.

Figure 7:
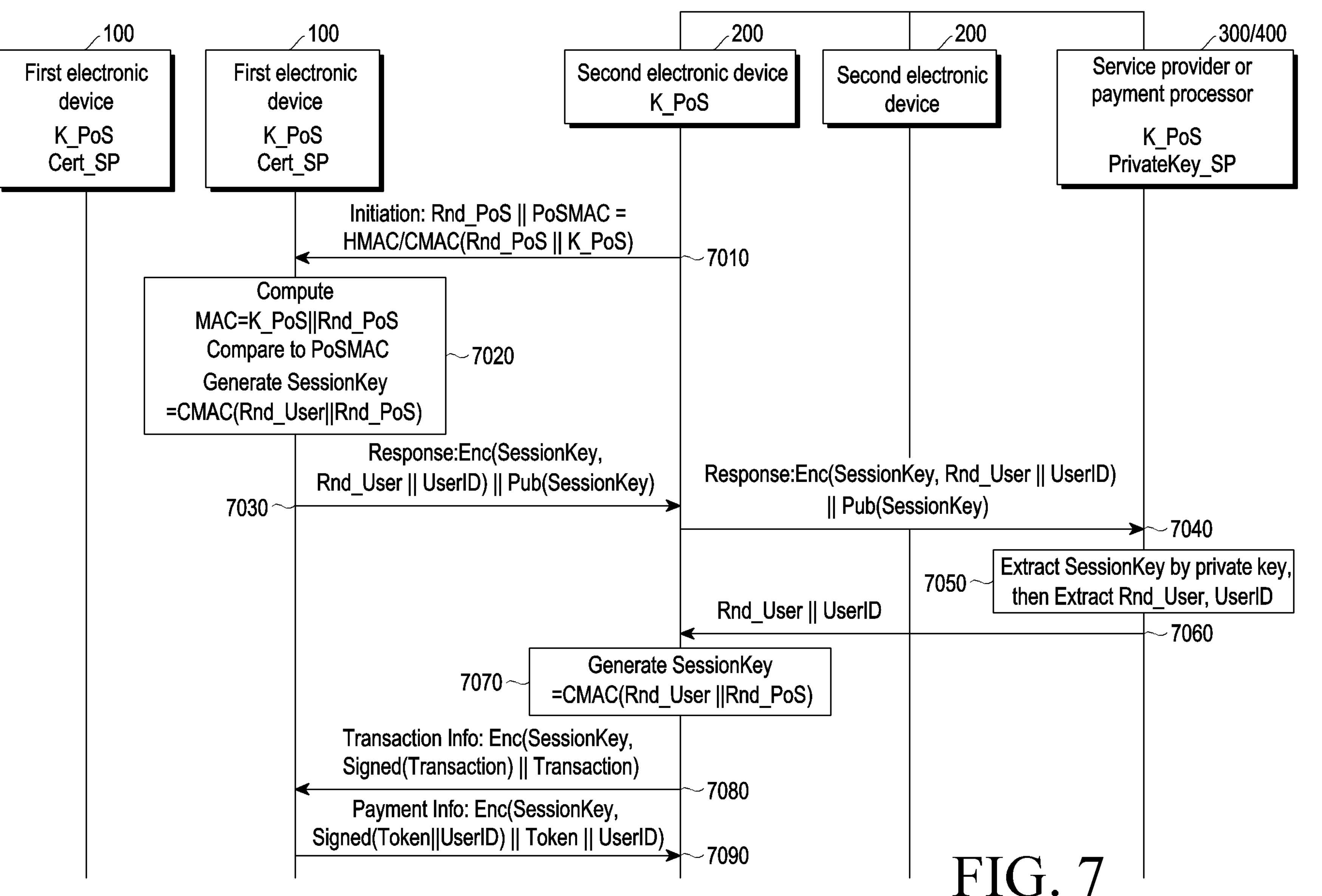
FIG. 7 illustrates an example payment processing method using UWB based on security information according to an embodiment of the disclosure.

A secure channel may be established between the first electronic device 100 and the second electronic device 200 through the exchange of the initiation message and the response message between the first electronic device 100 and the second electronic device 200 (or information/data included in the initiation message and the response message). Further, the transaction information message and the payment information message, which are described below, may be safely exchanged through the established secure channel. This is illustrated in FIG. 7.

<Operation 4030 and Transaction Information Message>

In operation 4030, the second electronic device 200 may transmit a transaction information message to the first electronic device 100.

Table 4 below shows an example of the transaction information message. In an embodiment, the transaction information may include transaction information related to payment. The transaction information may be payment-related private information transmitted from the second electronic device 200 to the first electronic device 100 (or a payment-related UWB-enabled application of the first electronic device). In an embodiment, the transaction information may include information about, e.g., amount (currency, price, or tax), merchant name, merchant ID, order number, payment protocol, shipping address, address for payment sheet, allowed card brand, and/or recurring.

In an embodiment, the transaction information message may be a UWB message (data frame) specified in the "UWB MAC standard of FiRa consortium".

In an embodiment, the transaction information message may include a header information element (IE) and/or a payload IE. Table 4 below shows an example of the payload IE of the transaction information message.

TABLE 4

| | Parameter | Size (bits) | Notes |
|---|---|---|---|
| | Length | 11 | Size of Content feld |
| | Group ID | 4 | 2 = Vendor Specific Nested IE |
| | Type | 1 | 1 = Payload IE |
| Content | Vendor OUI | 24 | TBD = Samsung QUI |
| | UWB Message ID | 4 | TBD = Transaction Information Message |
| | Reserved | 4 | Reserved for future usage |
| | Request Type | 2 | Bits can be set as below:<br>00: RFU<br>01: Card registration request<br>10: User ID request<br>11: Token request |
| | Request Data | Variable (MAX 204 byte) | 01: "" (NONE)<br>10: Enc(SessionKey, Transaction) \|\| MAC(SessionKey, Transaction)<br>11: Enc(SessionKey, Transaction) \|\| MAC(SessionKey, Transaction) |

Referring to Table 4, the transaction information message (or the payload IE of the transaction information message) may include a length field (information), a group ID field (information), a type field (information), and/or a content field (information). In an embodiment, the content field may include a vendor OUI field (information), a UWB message ID field (information), a request type field (information), and/or a request data field (information). Each field is described below.

The length field indicates the size (length) of the content field.

The group ID field indicates the type of the corresponding IE. For example, the group ID field may be set to a value (e.g., 2) indicating the vendor specific nested IE.

The type field indicates the type of the corresponding IE. For example, in the type field, the type of IE may be set to a value indicating the payload IE (e.g., 1).

The vendor OUI field indicates the vendor's OUI. The vendor OUI field may be, e.g., a field including a unique value of the vendor defining a message to ensure the uniqueness of the defined messages based on the IEEE standard. For example, the vendor OUI field may be set to a value indicating Samsung OUI or FiRa OUI.

The UWB message ID field may identify the UWB message. For example, in the case of the transaction information message, the UWB message ID field may be set to a value indicating that the UWB message is the transaction information message.

The request type field may be a field indicating the type of data to be requested from the first electronic device 100 (e.g., the user's mobile device). For example, the request type field may be a field indicating whether to send a card registration request, a user ID request, or a token request to the first electronic device 100.

In an embodiment, the request type field may be set to one of a first value (e.g., 01) for the card registration (or card information) request, a second value (e.g., 10) for the user ID request, or a third value (e.g., 11) for the token request. For example, when the request type field is set to the first value, the request type field may indicate that the second electronic device 200 sends the card registration request to the first electronic device 100. The request type field set to the first value may mean a card registration (information) request, e.g., in an enable payment procedure that is described below. Or, when the request type field is set to the second value, the request type field may indicate that the second electronic device 200 sends the user ID request to the first electronic device 100. The request type field set to the second value may mean the user ID request, e.g., in a buy procedure that is described below. Or, when the request type field is set to the third value, the request type field may indicate that the second electronic device 200 sends the token request to the first electronic device 100. The state field set to the third value may mean a token request, e.g., in an execute payment procedure or buying and payment procedure that is described below.

The request data field may include data corresponding to the type indicated by the request type field. For example, when the request type field is set to the first value for the card registration request, the request data field may not include data in the field. Or, when the request type field is set to the second value for user ID request, the request data field may include data related to transaction information. Alternatively, when the request type field is set to the third value for the token request, the request data field may include data related to transaction information. In an embodiment, the transaction-related data may include transaction information (or encrypted transaction information), message authentication code (MAC) for the transaction information (or encrypted transaction information), and/or nonce.

In an embodiment, the transaction information may be a type of URL or string for retrieving the whole purchased items.

In an embodiment, the transaction information-related data may be generated according to "Enc(SessionKey, Transaction)||MAC (SessionKey, Transaction)". For example, the transaction information-related data may be a value obtained by concatenating (including) a first value encrypted based on the transaction information and the session key and a second value obtained by applying a MAC function based on the session key. In an embodiment, the session key (payment session key) may be generated between the first electronic device 100 and the second electronic device 200 using the random values provided by the first electronic device 100 and the second electronic device 200, respectively. Since the encrypted transaction information is included in the request data field and transmitted, the user's privacy may be protected. In another embodiment, the transaction information-related data may include the transaction information itself.

<Operation 4040 and Payment Information Message>

In operation 4040, the first electronic device 100 may transmit a payment information message corresponding to the transaction information message to the second electronic device 200. In an embodiment, the payment information message may include information (e.g., card registration information, user ID, token) related to payment requested by the transaction request message.

In an embodiment, the payment information message may be a UWB message (data frame) specified in the "UWB MAC standard of FiRa consortium".

In an embodiment, the payment information message may include a header information element (IE) and/or a payload IE. Table 5 below shows an example of the payload IE of the payment information message.

TABLE 5

| | Parameter | Size (bits) | Notes |
|---|---|---|---|
| | Length | 11 | Size of Content field |
| | Group ID | 4 | 2 = Vendor Specific Nested IE |
| | Type | 1 | 1 = Payload IE |
| Content | Vendor OUI | 24 | TBD = Samsung OUI |
| | UWB Message ID | 4 | TBD = Payment Information Message |
| | Reserved | 4 | Reserved for future usage |
| | Response Data | var | Dependent on request type: 01b (Card Registration request): Enc(SessionKey, Signed(hash(CardInfo\|\|User ID)) \|\| Card info \|\| User ID) 10b (User ID request): Enc(SessionKey, Signed(hash(UserID)) \|\| User ID) 11b (Token request): Enc(SessionKey, Signed(hash(Token\|\|UserID) \|\| Token\|\| User ID) |

Referring to Table 5, the payment information message (or the payload IE of the payment information message) may include a length field (information), a group ID field (information), a type field (information), and/or a content field (information). In an embodiment, the content field may include a vendor OUI field (information), a UWB message ID field (information), and/or a response data field (information). Each field is described below.

The length field indicates the size (length) of the content field.

The group ID field indicates the type of the corresponding IE. For example, the group ID field may be set to a value (e.g., 2) indicating the vendor specific nested IE.

The type field indicates the type of the corresponding IE. For example, in the type field, the type of IE may be set to a value indicating the payload IE (e.g., 1).

The vendor OUI field indicates the vendor's OUI. The vendor OUI field may be, e.g., a field including a unique value of the vendor defining a message to ensure the uniqueness of the defined messages based on the IEEE standard. For example, the vendor OUI field may be set to a value indicating Samsung OUI and/or FiRa OUI.

The UWB message ID field may identify the UWB message. For example, in the case of the payment information message, the UWB message ID field may be set to a value indicating that the UWB message is the payment information message.

The response data field may include response data corresponding to the value of the request type field of the transaction information message. In an embodiment, the response data is confirmed and authenticated information and may be encrypted by the session key.

In an embodiment, when the value of the request type field is a first value for the card registration request, the response data field may include data for card registration. In an embodiment, the data for card registration may include card information and/or user ID. In an embodiment, the card information and user ID may be signed, encrypted based on the session key (payment session key), and included in the response data field. For example, the data for card registration may be generated according to "Enc(SessionKey, Signed(hash(CardInfo||User ID))||Card info||User ID)". Thus, integrity and privacy of card information and user ID may be protected.

In another embodiment, when the value of the request type field is the second value for the user ID request, the response data field may include data for the user ID. In an embodiment, the user ID may be signed, encrypted based on the session key (payment session key), and included in the response data field. For example, the data for the user ID may be generated according to "Enc(SessionKey, Signed (hash(UserID))||User ID)". Thus, the integrity and privacy of the user ID may be protected.

In another embodiment, when the value of the request type field is a third value for the token request, the response data field may include data for the token and/or user ID. In an embodiment, the token may be signed, encrypted based on the session key (payment session key), and included in the response data field. For example, the data for the token and/or user ID may be generated according to "Enc(SessionKey, Signed(hash(Token||UserID))||Token||User ID)". Thus, the token may be protected from, e.g., replay attacks.

Figure 5A:
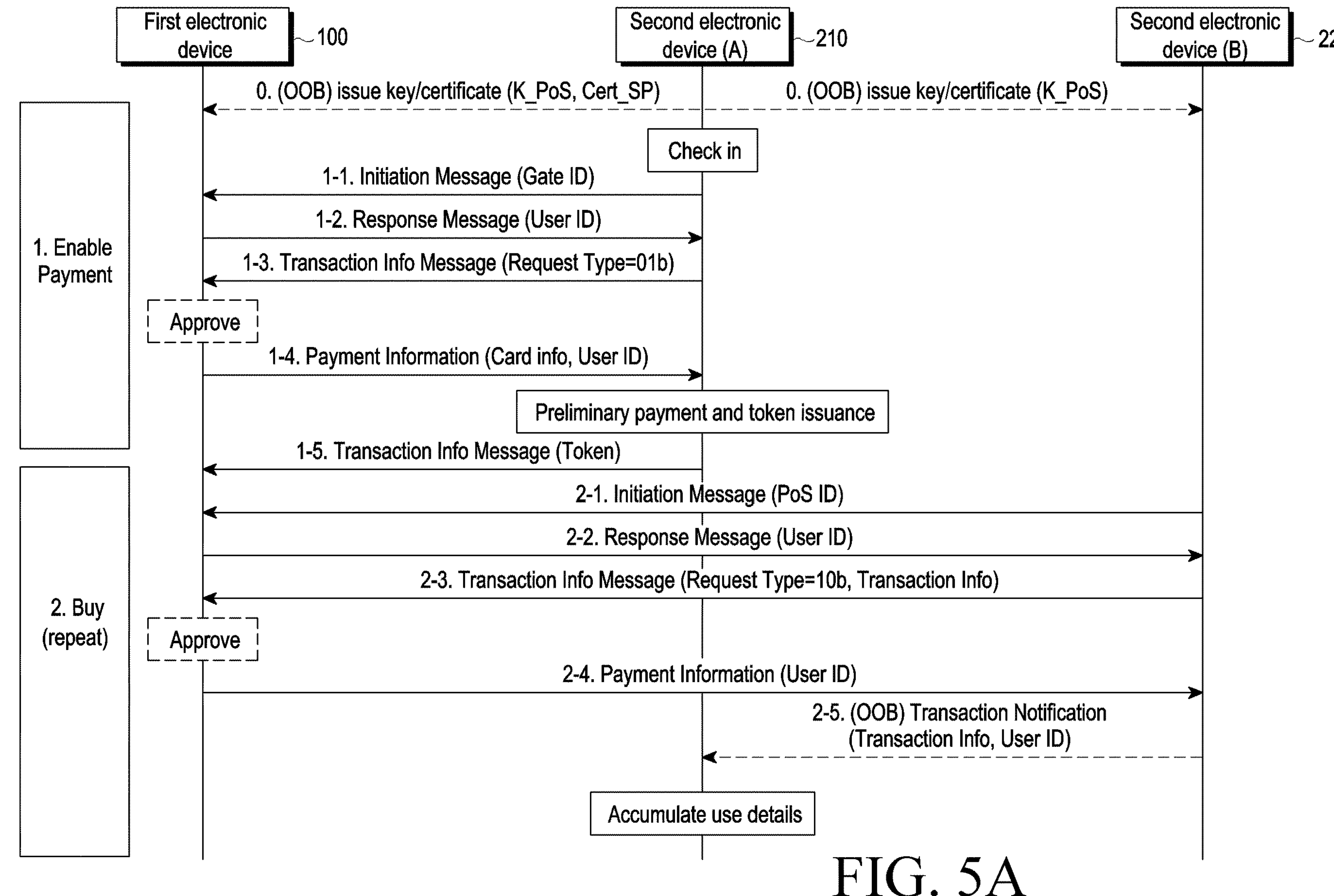
FIGS. 5A and 5B illustrate a first scenario for providing a payment service using UWB according to an embodiment of the disclosure.
Figure 5B:
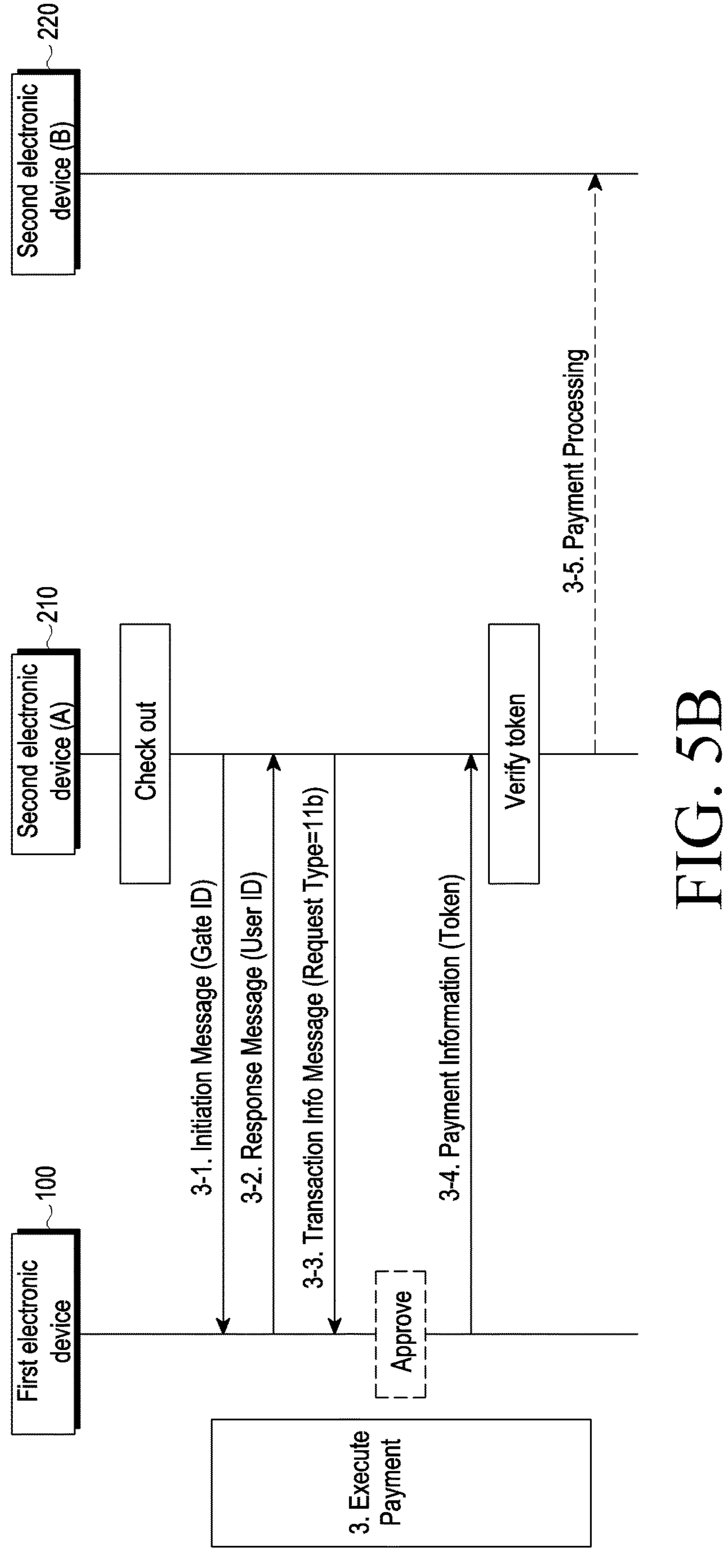

FIGS. 5A and 5B illustrate a first scenario for providing a payment service using UWB according to an embodiment of the disclosure.

In the disclosure, the procedures disclosed in FIGS. 5A and 5B correspond to a series of procedures illustrating a first scenario for providing a payment service using UWB. In other words, the execute payment procedure of FIG. 5B corresponds to the procedure in the first scenario performed after the buy procedure of FIG. 5A, but is shown as a separate view merely for convenience of illustration. In the disclosure, the embodiment of FIGS. 5A and 5B may be collectively referred to as the embodiment of FIGS. 5A and 5B.

In the embodiment of FIGS. 5A and 5B, the operation indicated by the dashed line is an optional operation that may be omitted according to an embodiment.

The embodiment of FIGS. 5A and 5B corresponds to an embodiment in which a buy procedure and an execute payment procedure using a token are performed by separate second electronic devices.

Described in the embodiment of FIGS. 5A and 5B is an example in which the first electronic device 100 is the user's mobile device, the second electronic device A 210 is a second electronic device (e.g., an electronic device (gate device) of a gate (e.g., a gate of an amusement park), and the second electronic device B 220 is a second electronic device (e.g., a PoS device of a specific store (e.g., a specific store in the amusement park)) performing a buy procedure with the first electronic device 100. In the embodiment of FIGS. 5A and 5B, the second electronic device A 210 and the second electronic device B 220 may be examples of the second electronic device 200 of FIG. 1.

In the embodiment of FIGS. 5A and 5B, it is assumed that the first electronic device 100 is the user's mobile device, the second electronic device A 210 is a gate device, and the second electronic device B 220 is a PoS device. For example, in the scenario illustrated in FIGS. 5A and 5B, it is assumed that the user of the mobile device enters (checks in) through the gate of the amusement park and performs batch payment for a list of purchases made through the PoS devices of stores in the amusement park, through the gate device when exiting (checks out) through the gate. However, embodiments of the disclosure are not limited thereto.

In the embodiment of FIGS. 5A and 5B, the second electronic device A 210 may be connected to a service provider, and the second electronic device B 220 may be connected to a payment processor. In the embodiment of FIGS. 5A and 5B, the service provider connected to the second electronic device A 210 may play a role to issue and verify tokens, and accumulate and store use details. In other words, the second electronic device B 220 does not have token information and may not verify the token.

Further, in the embodiment of FIGS. 5A and 5B, the payment processor connected by the second electronic device B 220 may be requested for payment processing (batch processing). In other words, the buy procedure may be repeatedly performed through each second electronic device B 220, but the payment processor may be requested for actual payment execution (processing), once for the whole purchased items. In this manner, batch payment may be made for the whole purchased items accumulated in one payment zone associated with the second electronic device A 210.

Referring to FIGS. 5A and 5B, the UWB payment service providing method may include an enable payment procedure (procedure 1) for enabling payment, a buy procedure (procedure 2), and an execute payment procedure (procedure 3) for executing payment. Further, the UWB payment service providing method may further include a key/certificate issuance procedure (procedure 0) performed before the enable payment procedure (procedure 1).

Through the key/certificate issuance procedure (procedure 0), an authentication key (K_PoS) for the second electronic device B 220 and a certificate (Cert_SP) for the service provider may be issued and provided to the first electronic device 100. Further, an authentication key (K_PoS) for the second electronic device B 220 may be issued and provided to the second electronic device A 210 and/or the second electronic device B 220. In an embodiment, the authentication key (K_PoS) and certificate (Cert_SP) may be generated (issued) by the service provider (or payment processor). In an embodiment, the authentication key (K_PoS) and the certificate (Cert_SP) may be transmitted through the OOB to the first electronic device 100, the second electronic device A 210 and/or the second electronic device B 220.

<Procedure 1>

When the first electronic device 100 comes within a certain distance from the gate device 210, the second electronic device A 210 may initiate procedure 1. For example, when the second electronic device A 210 identifies that the first electronic device 100 is positioned within a certain distance from the second electronic device A 210, the second electronic device A 210 may determine that the user enters through the gate and initiate procedure 1.

In an embodiment, the second electronic device A 210 may detect entry of the first electronic device 100 through the gate, through UWB. In this case, the first electronic device 100 may automatically enable the UWB communication module through BLE (e.g., a received BLE advertising packet/message) or manually enable the UWB communication module through execution of the payment application of the first electronic device 100 by a user input.

In operation 1-1 of procedure 1, the second electronic device A 210 may transmit an initiation message to the first electronic device 100. In an embodiment, the initiation message may include the ID (e.g., gate ID) of the second electronic device A 210. In an embodiment, the initiation message may include the payload IE of Table 2.

In operation 1-2 of procedure 1, the first electronic device 100 may transmit a response message corresponding to the initiation message to the second electronic device A 210. In an embodiment, the response message may include the user ID (e.g., user ID) of the first electronic device 100. In an embodiment, the response message may include the payload IE of Table 3.

In operation 1-3 of procedure 1, the second electronic device A 210 may transmit a transaction information message to the first electronic device 100. In an embodiment, the transaction information message may include the value of the request type field for the card registration request (e.g., request type=01 b). In an embodiment, the transaction information message may include the payload IE of Table 4.

In operation 1-4 of procedure 1, the first electronic device 100 may transmit a payment information message to the second electronic device A 210. In an embodiment, the payment information message may include response data corresponding to the value of the request type field of the transaction information message. For example, the payment information message may include response data including card information and/or user ID. In an embodiment, the payment information message may include the payload IE of Table 5.

In an embodiment, the first electronic device 100 may receive a user input for approval of providing card information and, when approved, transmit a payment information message including card information to the second external electronic device A 210. In another embodiment, the first electronic device 100 may omit the user approval procedure at this stage.

The second electronic device A 210 may execute preliminary payment based on the information included in the payment information message and issue a token for the user of the first electronic device 100 through the service provider or payment processor. The description of, e.g., FIG. 3 may be referenced for the token issuance procedure.

In operation 1-5 of procedure 1, the second electronic device A 210 may transmit a transaction information message to the first electronic device 100. In an embodiment, the transaction information message may include the issued token.

Through procedure 1, a token corresponding to the user's card information may be issued to the user, and the token may be used for a payment service in the place.

<Procedure 2>

In operation 2-1 of procedure 2, the second electronic device B 220 may transmit an initiation message to the first electronic device 100. In an embodiment, the initiation message may include the ID (e.g., PoS ID) of the second electronic device B 220. In an embodiment, the initiation message may include the payload IE of Table 2.

In operation 2-2 of procedure 2, the first electronic device 100 may transmit a response message to the initiation message to the second electronic device B 220. In an embodiment, the response message may include the user ID of the first electronic device 100. In an embodiment, the response message may include the payload IE of Table 3.

In operation 2-3 of procedure 2, the second electronic device B 220 may transmit a transaction information message to the first electronic device 100. In an embodiment, the transaction information message may include transaction information including the use details (purchase details) through the second electronic device B 220 and the value (e.g., request type=10b) of the request type field for the user ID request. In an embodiment, the transaction information message may include the payload IE of Table 4.

In operation 2-4 of procedure 2, the first electronic device 100 may transmit a payment information message to the second electronic device B 220. In an embodiment, the payment information message may include response data corresponding to the value of the request type field of the transaction information message. For example, the payment information message may include the user ID. In an embodiment, the payment information message may include the payload IE of Table 5.

The second electronic device B 220 receiving the payment information message may transmit a transaction notification message including the transaction information and user ID to the second electronic device A 210. In an embodiment, the transaction notification message may be transmitted through the OOB. Meanwhile, the user's first electronic device 100 may repeatedly perform the above-described buy procedure with a plurality of second electronic devices B 220. In this case, each second electronic device B 220 may transmit the transaction notification message to the second electronic device A 210 or the service provider connected to the second electronic device A 210. Thus, the user's use details (purchase details) through each second electronic device B 220 may be accumulated in the second electronic device A 210 or the service provider connected with the second electronic device A 210.

<Procedure 3>

When the first electronic device 100 comes within a certain distance from the second electronic device A 210, the second electronic device A 210 may initiate procedure 3. For example, when the second electronic device A 210 identifies that the first electronic device 100 where card information is registered is positioned within a certain distance (e.g., in the pay zone) from the second electronic device A 210, the second electronic device A 210 may determine that the user enters through the gate and initiate procedure 1.

In operation 3-1 of procedure 3, the second electronic device A 210 may transmit an initiation message to the first electronic device 100. In an embodiment, the initiation message may include the ID (e.g., gate ID) of the second electronic device A 210. In an embodiment, the initiation message may include the payload IE of Table 2.

In operation 3-2 of procedure 3, the first electronic device 100 may transmit a response message corresponding to the initiation message to the second electronic device A 210. In an embodiment, the response message may include the user ID of the first electronic device 100. In an embodiment, the response message may include the payload IE of Table 3.

In operation 3-3 of procedure 3, the second electronic device A 210 may transmit a transaction information message to the first electronic device 100. In an embodiment, the transaction information message may include the value of the request type field for the token request (e.g., request type=11b). In an embodiment, the transaction information message may further include the whole use details. In an embodiment, the transaction information message may include the payload IE of Table 4.

In operation 3-4 of procedure 3, the first electronic device 100 may transmit a payment information message to the second electronic device A 210. In an embodiment, the payment information message may include response data corresponding to the value of the request type field of the transaction information message. For example, the payment information message may include the token. In an embodiment, the payment information message may include the payload IE of Table 5.

In an embodiment, the first electronic device 100 may receive a user input for approval of providing the token and, when approved, transmit a payment information message including the token to the second external electronic device A 210. In another embodiment, the first electronic device 100 may omit the user approval procedure at this stage.

The second electronic device A 210 may verify the token included in the payment information message through the service provider. When the token is verified, as in operation 3-5, the second electronic device A 210 may perform payment processing with the payment processor through the second electronic device B 220. Or, when the token is verified, the second electronic device A 210 may directly perform payment processing.

In the above-described embodiment, it is assumed that the first electronic device 100 is the user's mobile device, the second electronic device B 220 performing the buy procedure with the first electronic device 100 is a PoS device, and the second electronic device A 210 performing the execute payment procedure with the first electronic device 100 is a gate device, but the embodiments are not limited thereto. For example, one of the PoS devices may be used as the second electronic device A 210. For example, the PoS device at a ticket office may be used as the second electronic device (A) 210.

Figure 6:
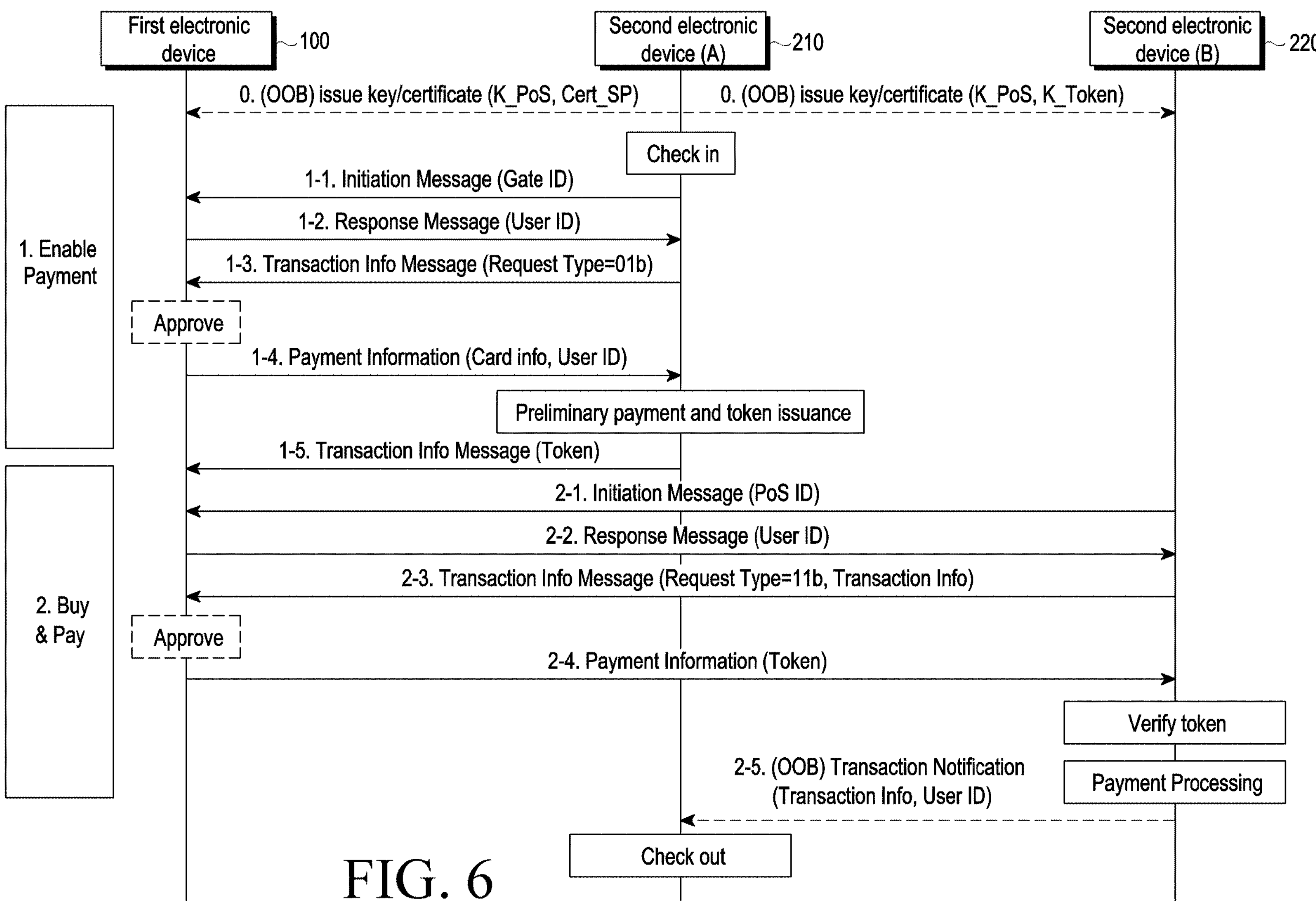
FIG. 6 illustrates a second scenario for providing a payment service using UWB according to an embodiment of the disclosure.

FIG. 6 illustrates a second scenario for providing a payment service using UWB according to an embodiment of the disclosure.

In the embodiment of FIG. 6, the operation indicated by the dashed line is an optional operation that may be omitted according to an embodiment.

The embodiment of FIG. 6 corresponds to an embodiment in which a buy procedure and an execute payment procedure using a token are performed by one second electronic device.

Described in the embodiment of FIG. 6 is an example in which the first electronic device 100 is the user's mobile device, the second electronic device A 210 is a second electronic device (e.g., a gate device) performing an enable payment procedure with the first electronic device 100, and the second electronic device B 220 is a second electronic device (e.g., a PoS device) performing a buying and payment procedure with the first electronic device 100. Unlike the embodiment of FIGS. 5A and 5B, in the embodiment of FIG. 6, the second electronic device A 210 only performs the enable payment procedure with the first device. In the embodiment of FIG. 6, the second electronic device A 210 and the second electronic device B 220 may be examples of the second electronic device 200 of FIG. 1.

In the embodiment of FIG. 6, it is assumed that the first electronic device 100 is the user's mobile device, the second electronic device A 210 is a gate device, and the second electronic device B 220 is a PoS device. For example, in the scenario illustrated in FIG. 6, it is assumed that the user of the mobile device checks in through the gate of the amusement park and looks up all use details of the purchases and payments through the PoS devices in stores, when checking out through the gate. However, embodiments of the disclosure are not limited thereto.

In the embodiment of FIG. 6, the second electronic device A 210 may be connected to a service provider, and the second electronic device B 220 may be connected to a payment processor. In the embodiment of FIG. 6, the service provider connected to the second electronic device A 210 issues the token, but it is the second electronic device B 220 that verifies the token. To that end, the second electronic device B 220 may receive token information (e.g., token encryption key (K_token)) from the service provider. Thus, processing of the buying and payment procedure may be performed by the second electronic devices B 220 together.

Referring to FIG. 6, the UWB payment service providing method may include an enable payment procedure (procedure 1) for enabling payment and a buy and pay procedure (procedure 2). Further, the UWB payment service providing method may further include a key/certificate issuance procedure (procedure 0) performed before the enable payment procedure.

Through the key/certificate issuance procedure (procedure 0), an authentication key (K_PoS) for the second electronic device B 220 and a certificate (Cert_SP) for the service provider may be issued and provided to the first electronic device 100. Further, an authentication key (K_PoS) and token encryption key (K_token) for the second electronic device B 220 may be issued and provided to the second electronic device B 220. Unlike the embodiment of FIGS. 5A and 5B, in the embodiment of FIG. 6, since the token encryption key (K_token) used for token verification is provided to the second electronic device B 220, the second electronic device B 220 may perform payment processing through token verification.

In an embodiment, the authentication key (K_PoS), certificate (Cert_SP), and token encryption key (K_token) may be generated (issued) by the service provider (or payment processor). In an embodiment, the authentication key (K_PoS), certificate (Cert_SP), and token encryption key (K_token) may be transmitted to the first electronic device 100 and the second electronic device B 220 through the OOB.

<Procedure 1>

When the first electronic device 100 comes within a certain distance from the second electronic device A 210, the second electronic device A 210 may initiate procedure 1. For example, when the second electronic device A 210 identifies that the first electronic device 100 is positioned within a certain distance from the second electronic device A 210, the second electronic device A 210 may determine that the user enters through the gate and initiate procedure 1.

In an embodiment, the second electronic device A 210 may detect entry of the first electronic device 100 through the gate, through UWB. In this case, the first electronic device 100 may automatically enable the UWB communication module through BLE (e.g., a received BLE advertising packet/message) or manually enable the UWB communication module through execution of the payment application of the first electronic device 100 by a user input.

In operation 1-1 of procedure 1, the second electronic device A 210 may transmit an initiation message to the first electronic device 100. In an embodiment, the initiation message may include the ID (e.g., gate ID) of the second electronic device A 210. In an embodiment, the initiation message may include the payload IE of Table 2.

In operation 1-2 of procedure 1, the first electronic device 100 may transmit a response message corresponding to the initiation message to the second electronic device A 210. In an embodiment, the response message may include the user ID of the first electronic device 100. In an embodiment, the response message may include the payload IE of Table 3.

In operation 1-3 of procedure 1, the second electronic device A 210 may transmit a transaction information message to the first electronic device 100. In an embodiment, the transaction information message may include the value of the request type field for the card registration request (e.g., request type=01b). In an embodiment, the transaction information message may include the payload IE of Table 4.

In operation 1-4 of procedure 1, the first electronic device 100 may transmit a payment information message to the second electronic device A 210. In an embodiment, the payment information message may include response data corresponding to the value of the request type field of the transaction information message. For example, the payment information message may include response data including card information and/or user ID. In an embodiment, the payment information message may include the payload IE of Table 5.

In an embodiment, the first electronic device 100 may receive a user input for approval of providing card information and, when approved, transmit a payment information message including card information to the second external electronic device A 210. In another embodiment, the first electronic device 100 may omit the user approval procedure at this stage.

The second electronic device A 210 may execute preliminary payment based on the information included in the payment information message and issue a token for the user of the first electronic device 100 through the service provider or payment processor. The description of, e.g., FIG. 3 may be referenced for the token issuance procedure.

In operation 1-5 of procedure 1, the second electronic device A 210 may transmit a transaction information message to the first electronic device 100. In an embodiment, the transaction information message may include the token.

Through procedure 1, a token corresponding to the user's card information may be issued to the user, and the token may be used for a payment service in the place.

<Procedure 2>

In operation 2-1 of procedure 2, the second electronic device B 220 may transmit an initiation message to the first electronic device 100. In an embodiment, the initiation message may include the ID (e.g., PoS ID) of the second electronic device B 220. In an embodiment, the initiation message may include the payload IE of Table 2.

In operation 2-2 of procedure 2, the first electronic device 100 may transmit a response message to the initiation message to the second electronic device B 220. In an embodiment, the response message may include the user ID of the first electronic device 100. In an embodiment, the response message may include the payload IE of Table 3.

In operation 2-3 of procedure 2, the second electronic device B 220 may transmit a transaction information message to the first electronic device 100. In an embodiment, the transaction information message may include transaction information including the use details through the second electronic device B 220 and the value (e.g., request type=11b) of the request type field for the token request. In an embodiment, the transaction information message may include the payload IE of Table 4.

In operation 2-4 of procedure 2, the first electronic device 100 may transmit a payment information message to the second electronic device A 210. In an embodiment, the payment information message may include response data corresponding to the value of the request type field of the transaction information message. For example, the payment information message may include the token. In an embodiment, the payment information message may include the payload IE of Table 5.

In an embodiment, the first electronic device 100 may receive a user input for approval of providing the token and, when approved, transmit a payment information message including the token to the second external electronic device A 210. In another embodiment, the first electronic device 100 may omit the user approval procedure at this stage.

The second electronic device B 220 may verify the token included in the payment information message based on the issued token encryption key. When the token is verified, the second electronic device A 210 may perform payment processing with the payment processor based on the token.

The second electronic device B 220 may transmit a payment notification message including the transaction information and user ID to the second electronic device A 210. In an embodiment, the payment notification message may be transmitted through the OOB. Usage details may be accumulated through the payment notification message transmitted through each second electronic device B 220, and the user may look up the whole use details accumulated.

In the above-described embodiment, it is assumed that the first electronic device 100 is the user's mobile device, the second electronic device B 220 performing the enable payment procedure with the first electronic device 100 is a gate device, and the second electronic device B 220 performing the buy and pay procedure with the first electronic device 100 is a PoS device, but the embodiments are not limited thereto. For example, one of the PoS devices may be used as the second electronic device A 210. For example, the PoS device at a ticket office may be used as the second electronic device (A) 210.

FIG. 7 illustrates an example payment processing method using UWB based on security information according to an embodiment of the disclosure.

The embodiment of FIG. 7 may be a procedure corresponding to any one or some of the enable payment procedure, buy procedure, or execute payment procedure of FIGS. 5A and 5B or the enable payment procedure or buy and pay procedure of FIG. 6.

The procedure of FIG. 7 may be performed by at least one first electronic device 100, at least one second electronic device 200, and/or the service provider 300/payment processor 400.

Referring to FIG. 7, in operation 7010, the second electronic device 200 may transmit an initiation message to the first electronic device 100. In an embodiment, the initiation message may include first data associated with a random value (nonce). In an embodiment, the first data may include a random value (Rnd_Pos) generated by the second electronic device 200 and a message authentication code for authentication of the random value. For example, the first data may include the value generated according to "Rnd_Pos||PoSMAC=HMAC/CMAC (Rnd_Pos||K_PoS)". Here, PoSMAC means a message authentication code generated by applying an HMAC or CMAC function to Rnd_PoS and K_Pos. In an embodiment, the initiation message may transmit the first data through the payload IE of Table 2.

In operation 7020, the first electronic device 100 may calculate the message authentication code (MAC) based on the random value (Rnd_PoS) of the first data and the authentication key (K_Pos) for the second electronic device 200 and compare it with the message authentication code (PoSMAC) included in the first data to authenticating the random value. In an embodiment, the message authentication code (MAC) may be generated based on "MAC=K_PoS||Rnd_PoS". Further, the first electronic device may generate a session key (SessionKey) based on the random value (Rnd_Pos) of the first data and the random value (Rnd_User) generated by the first electronic device 100. In an embodiment, the session key (payment session key) may be generated according to "SessionKey=CMAC (Rnd_User||Rnd_PoS)". In other words, the session key may be generated by applying the CMAC function to Rnd_User and Rnd_Pos.

In operation 7030, the first electronic device 100 may transmit a response message corresponding to the initiation message to the second electronic device 200. In an embodiment, the response message may include second data associated with the user ID. In an embodiment, the second data may include an encryption value based on the user ID and a session key. In an embodiment, the second data may be generated according to "Enc (Sessionkey, Rnd_User||UserID)||Pub (SessionKey)". In other words, the second data may include the value obtained by encrypting the Rnd_User and the user ID with the session key and the session key encrypted with the public key of the service provider 300. In an embodiment, the response message may transmit the second data through the payload IE of Table 3.

In operation 7040, the second electronic device 200 may transfer the received second data (response message) to the service provider 300 or the payment processor 400.

In operation 7050, the service provider 300 or the payment processor 400 may extract the session key (SessionKey) from the second data, based on the private key (PrivateKey_SP) associated with the public key (Pub) of the service provider 300, and may extract the Rnd_User and the user ID (UserID).

In operation 7060, the service provider 300 or the payment processor 400 may transfer the Rnd_User and the user ID to the second electronic device 200.

In operation 7070, the second electronic device 200 may generate a session key based on the random value (Rnd_PoS) of the second electronic device 200 and the random value (Rnd_User) of the first electronic device 100. In an embodiment, the session key may be generated according to "CMAC (Rnd_User||Rnd_PoS)". In this way, the first electronic device 100 and the second electronic device 200 may generate the same session key by applying the same MAC function based on their respective generated random values. The so-generated session key may be used to protect the user ID as described above.

In operation 7080, the second electronic device 200 may transmit a transaction information message to the first electronic device 100. In an embodiment, the transaction information message may include third data associated with the transaction information. In an embodiment, the transaction information may be encrypted based on the session key. For example, the third data may be generated according to "Enc (SessionKey, Signed (Transaction)||Transaction)". That is, the third data may include transaction information and the value obtained by encrypting the signature value of the transaction information with the session key. In an embodiment, the transaction information message may transmit the third data through the payload IE of Table 4.

In operation 7090, the first electronic device 100 may transmit a payment information message corresponding to the transaction information message to the second electronic device 200. In an embodiment, the payment message may include fourth data associated with the token and/or the user ID. In an embodiment, the token and/or the user ID may be encrypted based on the session key. For example, the fourth data may be generated according to "Enc (SessionKey, Signed(Token||UserID)||Token||UserID)". In other words, the fourth data may include the value obtained by encrypting the token, user ID, and signature value of the token/user ID with the session key. The payment information message may transmit the fourth data through the payload IE of Table 5.

Figure 8:
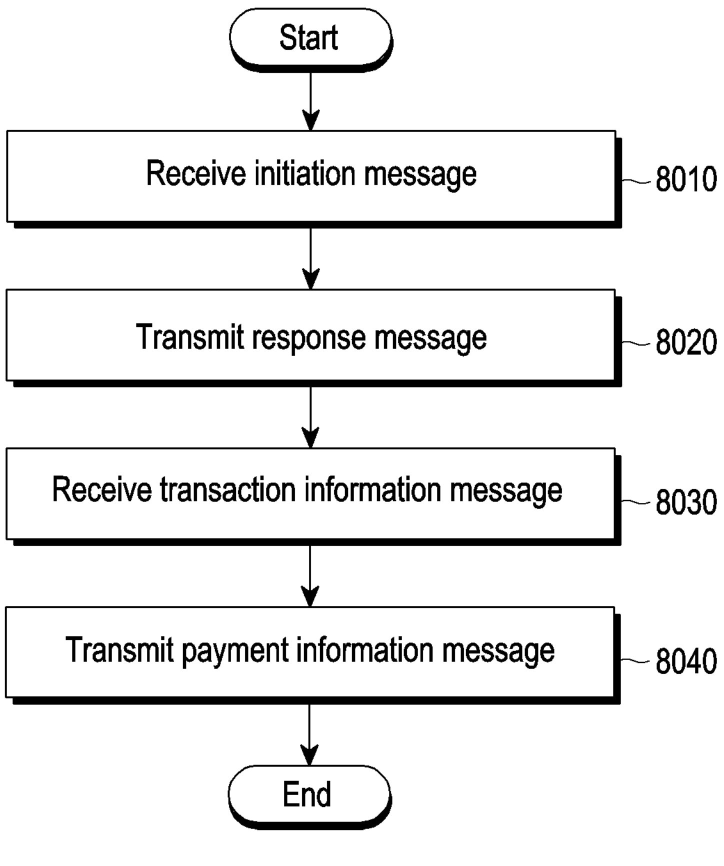
FIG. 8 is a flowchart illustrating a method by a first electronic device according to an embodiment of the disclosure.

FIG. 8 is a flowchart illustrating a method by a first electronic device according to an embodiment of the disclosure.

In an embodiment of FIG. 8, as described above, the first electronic device may be the electronic device that transmits a response message corresponding to the initiation message for UWB ranging to the second electronic device. For example, the first electronic device may be the first electronic device (e.g., the mobile device of the user) of FIGS. 1, 2B, 5, and 6.

Further, in the embodiment of FIG. 8, the second electronic device may be an electronic device that transmits an initiation message for UWB ranging to the first electronic device as described above. For example, the second electronic device may be, e.g., the second electronic device A (e.g., a gate device) and the first electronic device B (e.g., a PoS device) of FIGS. 1, 2B, 5, and 6.

Referring to FIG. 8, the first electronic device may receive, from the second electronic device, an initiation message for UWB ranging including the random number generated by the second electronic device (8010). For a description of the initiation message and the random number (e.g., nonce), refer to the descriptions of FIGS. 1, 2A, 2B, 3, 4, 5A, 5B, 6, and 7.

The first electronic device may transmit, to the second electronic device, a response message to the initiation message including the identification information about the first electronic device encrypted using the session key generated based on the random number (8020). For a description of the session key (payment session key) generated using the response message and the random number, refer to the description of FIGS. 1, 2A, 2B, 3, 4, 5A, 5B, 6, and 7.

The first electronic device may receive, from the second electronic device, the transaction information message including request type information indicating the type of the request associated with payment (8030). For a description of the transaction information message and request type information (field), refer to the description of FIGS. 1, 2A, 2B, 3, 4, 5A, 5B, 6, and 7.

The first electronic device may transmit a payment information message including response data based on the request type information to the second electronic device (8040). For a description of the response data and payment information message, refer to the description of FIGS. 1, 2A, 2B, 3, 4, 5A, 5B, 6, and 7.

In an embodiment, the request type information may be set to any one of a first value indicating a request for card registration for payment, a second value indicating a request for identification information about the first electronic device, or a third value indicating a request for a token generated based on the information about the registered card.

In an embodiment, when the request type information is set to the first value indicating the request for card registration, the response data may include card information encrypted based on the session key, when the request type information is set to the second value indicating the request for identification information about the first electronic device, the response data may include identification information about the first electronic device encrypted based on the session key, and when the request type information is set to the third value indicating the request for the token, the response data may include the token encrypted based on the session key.

In an embodiment, when the response data includes card information, a token may be generated by the second electronic device based on the card information.

In an embodiment, when the response data includes a token, the token may be verified for payment processing by the second electronic device.

In an embodiment, when the request type information is set to the second value or the third value indicating the request for the identification information about the first electronic device, the transaction information message may further include the transaction information encrypted based on the session key. In an embodiment, the encrypted transaction information may be included in the request data field of the transaction information message.

In an embodiment, the transaction information may include information for identifying an item purchased through the second electronic device. In an embodiment, the information for identifying the purchased item may include a URL or a string for searching for the purchased item.

Figure 9:
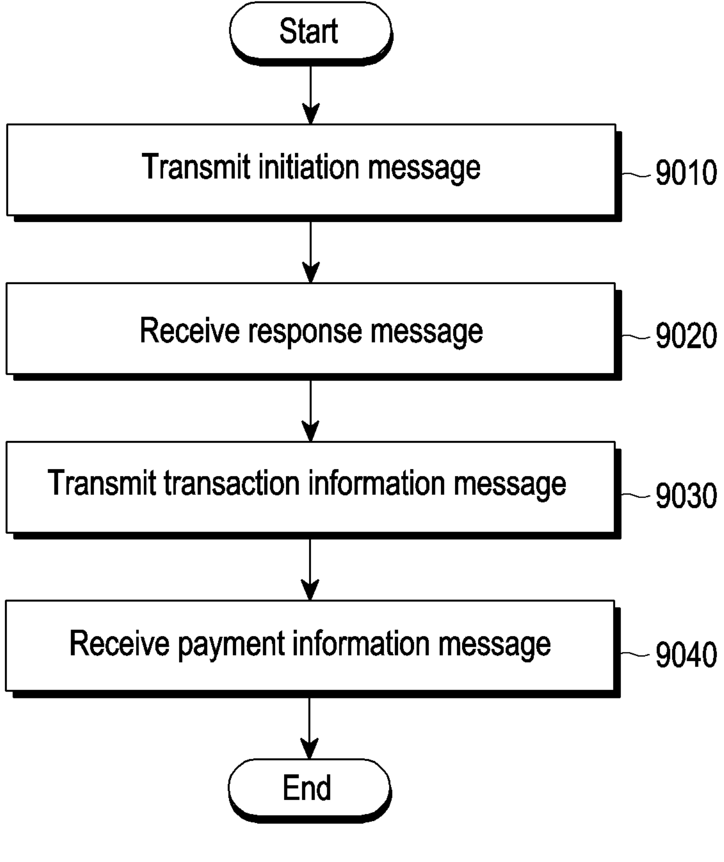
FIG. 9 is a flowchart illustrating a method by a second electronic device according to an embodiment of the disclosure.

FIG. 9 is a flowchart illustrating a method by a second electronic device according to an embodiment of the disclosure.

In the embodiment of FIG. 9, the second electronic device may be an electronic device that transmits an initiation message for UWB ranging to the first electronic device as described above. For example, the second electronic device may be, e.g., the second electronic device A (e.g., a gate device) and the first electronic device B (e.g., a PoS device) of FIGS. 1, 2B, 5, and 6.

Further, in an embodiment of FIG. 9, as described above, the first electronic device may be the electronic device that transmits a response message corresponding to the initiation message for UWB ranging to the second electronic device. For example, the first electronic device may be the first electronic device (e.g., the mobile device of the user) of FIGS. 1, 2B, 5, and 6.

Referring to FIG. 9, the second electronic device may transmit, to the first electronic device, an initiation message for UWB ranging including the random number generated by the second electronic device (9010). For a description of the initiation message and the random number (e.g., nonce), refer to the descriptions of FIGS. 1, 2A, 2B, 3, 4, 5A, 5B, 6, and 7.

The second electronic device may receive, from the first electronic device, a response message to the initiation message including the identification information about the first electronic device encrypted using the session key generated based on the random number (9020). For a description of the session key (payment session key) generated using the response message and the random number, refer to the description of FIGS. 1, 2A, 2B, 3, 4, 5A, 5B, 6, and 7.

The second electronic device may transmit, to the first electronic device, the transaction information message including request type information indicating the type of the request associated with payment (9030). For a description of the transaction information message and request type information (field), refer to the description of FIGS. 1, 2A, 2B, 3, 4, 5A, 5B, 6, and 7.

The second electronic device may receive a payment information message including response data based on the request type information from the first electronic device (9040). For a description of the response data and payment information message, refer to the description of FIGS. 1, 2A, 2B, 3, 4, 5A, 5B, 6, and 7.

In an embodiment, the request type information may be set to any one of a first value indicating a request for card registration for payment, a second value indicating a request for identification information about the first electronic device, or a third value indicating a request for a token generated based on the information about the registered card.

In an embodiment, when the request type information is set to the first value indicating the request for card registration, the response data may include card information encrypted based on the session key, when the request type information is set to the second value indicating the request for identification information about the first electronic device, the response data may include identification information about the first electronic device encrypted based on the session key, and when the request type information is set to the third value indicating the request for the token, the response data may include the token encrypted based on the session key.

In an embodiment, when the response data includes card information, the second electronic device may generate a token based on the card information.

In an embodiment, when the response data includes the token, the second electronic device may verify the token for payment processing.

In an embodiment, when the request type information is set to the second value or the third value indicating the request for the identification information about the first electronic device, the transaction information message may further include the transaction information encrypted based on the session key. In an embodiment, the encrypted transaction information may be included in the request data field of the transaction information message.

In an embodiment, the transaction information may include information for identifying an item purchased through the second electronic device. In an embodiment, the information for identifying the purchased item may include a URL or a string for searching for the purchased item.

Figure 10:
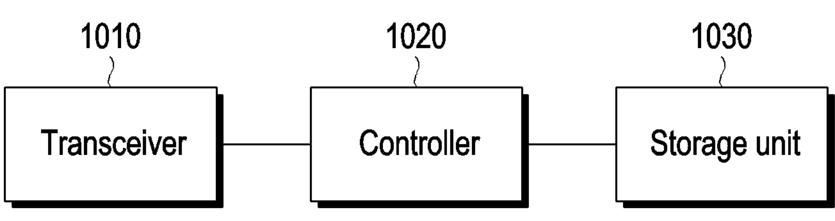
FIG. 10 is a view illustrating a structure of a first electronic device according to an embodiment of the disclosure.

FIG. 10 is a view illustrating a structure of a first electronic device according to an embodiment of the disclosure.

In the embodiment of FIG. 10, the first electronic device may be, e.g., the first electronic device of FIGS. 1, 2B, 5, and 6 (e.g., the user's mobile device).

Referring to FIG. 10, the first electronic device may include a transceiver 1010, a controller 1020, and a storage 1030. In the disclosure, the controller may be defined as a circuit or application-specific integrated circuit or at least one processor.

The transceiver 1010 may transmit and receive signals to/from other network entities. The transceiver 1010 may transmit and receive data for payment to/from the second electronic device through, e.g., UWB communication.

The controller 1020 may control the overall operation of the first electronic device according to an embodiment. For example, the controller 1020 may control inter-block signal flow to perform the operations according to the above-described flowchart. Specifically, the controller 1020 may control the operations of the first electronic device described above with reference to FIGS. 1, 2A, 2B, 3, 4, 5A, 5B, 6, 7, 8, and 9.

The storage unit 1030 may store at least one of information transmitted/received via the transceiver 1010 and information generated via the controller 1020. For example, the storage unit 1030 may store information and data for payment processing using UWB described above with reference to FIGS. 1, 2A, 2B, 3, 4, 5A, 5B, 6, 7, 8, and 9.

Figure 11:
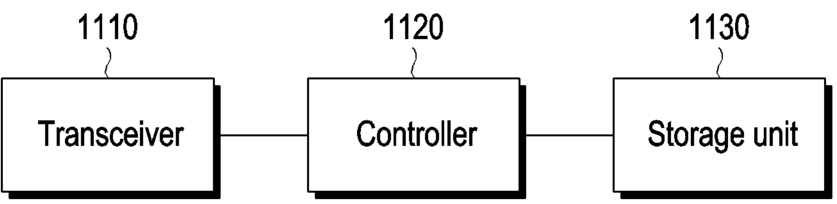
FIG. 11 is a view illustrating a structure of a second electronic device according to an embodiment of the disclosure.

FIG. 11 is a view illustrating a structure of a second electronic device according to an embodiment of the disclosure.

In the embodiment of FIG. 11, the second electronic device may be, e.g., the second electronic device A (e.g., a gate device) and the first electronic device B (e.g., a PoS device) of FIGS. 1, 2B, 5, and 6.

Referring to FIG. 11, the second electronic device may include a transceiver 1110, a controller 1120, and a storage 1130. In the disclosure, the controller may be defined as a circuit or application-specific integrated circuit or at least one processor.

The transceiver 1110 may transmit and receive signals to/from other network entities. The transceiver 1110 may transmit and receive data for payment to/from the first electronic device through, e.g., UWB communication.

The controller 1120 may control the overall operation of the second electronic device according to an embodiment. For example, the controller 1120 may control inter-block signal flow to perform the operations according to the above-described flowchart. Specifically, the controller 1120 may control the operations of the second electronic device described above with reference to FIGS. 1, 2A, 2B, 3, 4, 5A, 5B, 6, 7, 8, and 9.

The storage unit 1130 may store at least one of information transmitted/received via the transceiver 1110 and information generated via the controller 1120. For example, the storage unit 1130 may store information and data for payment processing using UWB described above with reference to FIGS. 1, 2A, 2B, 3, 4, 5A, 5B, 6, 7, 8, and 9.

In the above-described specific embodiments, the components included in the disclosure are represented in singular or plural forms depending on specific embodiments proposed. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise.

Although specific embodiments of the present invention have been described above, various changes may be made thereto without departing from the scope of the present invention. Thus, the scope of the disclosure should not be limited to the above-described embodiments, and should rather be defined by the following claims and equivalents thereof.

The invention claimed is:

1. A method performed by a first electronic device using ultra-wide band (UWB) communication, the method comprising:

receiving, from a second electronic device, a UWB ranging initiation message including certificate information for the second electronic device;

transmitting, to the second electronic device, a UWB ranging response message, the UWB ranging response message including identification information for the first electronic device;

deriving a session key based on the certificate information for the second electronic device;

establishing a secure channel between the first electronic device and the second electronic device using the session key;

receiving, from the second electronic device, a transaction information message using the session key via the secure channel; and transmitting, to the second electronic device, a payment information message using the session key via the secure channel, wherein the payment information message includes a token for a payment.

2. The method of claim 1, wherein the transaction information message includes request type information indicating a type of a request associated with payment, and wherein the request type information is set to any one of a first value indicating a request for card registration for the payment, a second value indicating a request for the identification information on the first electronic device, or a third value indicating a request for a second token generated based on information on a registered card.

3. The method of claim 2, wherein in case that the request type information is set to the first value indicating the request for card registration, response data in the payment information message includes card information encrypted based on the session key generated based on a random number included in the UWB ranging initiation message, wherein in case that the request type information is set to the second value indicating the request for the identification information on the first electronic device, the response data includes the identification information on the first electronic device encrypted based on the session key, and wherein in case that the request type information is set to the third value indicating the request for the second token, the response data includes the second token encrypted based on the session key.

4. The method of claim 3, wherein in case that the response data includes the card information, the second token is generated by the second electronic device based on the card information.

5. The method of claim 3, wherein in case that the response data includes the second token, the second token is verified for payment processing by the second electronic device.

6. The method of claim 2, wherein in case that the request type information is set to the second value or the third value, the transaction information message further includes transaction information encrypted based on the session key generated based on a random number included in the UWB ranging initiation message, and wherein the transaction information includes information for identifying an item purchased through the second electronic device.

7. The method of claim 6, wherein the information for identifying the purchased item includes a uniform resource locator (URL) or a string for searching for the purchased item.

8. A first electronic device using ultra-wide band (UWB) communication, the first electronic device using UWB communication comprising:

a transceiver; and at least one processor connected to the transceiver and configured to:

receive, from a second electronic device, a UWB ranging initiation message including certificate information for the second electronic device, transmit, to the second electronic device, a UWB ranging response message, the UWB ranging response message including identification information for the first electronic device, derive a session key based on the certificate information for the second electronic device, establish a secure channel between the first electronic device and the second electronic device using the session key, receive, from the second electronic device, a transaction information message using the session key via the secure channel, and transmit, to the second electronic device, a payment information message using the session key via the secure channel, wherein the payment information message includes a token for a payment.

9. The first electronic device of claim 8, wherein the transaction information message includes request type information indicating a type of a request associated with payment, and wherein the request type information is set to any one of a first value indicating a request for card registration for the payment, a second value indicating a request for the identification information on the first electronic device, or a third value indicating a request for a second token generated based on information on a registered card, wherein in case that the request type information is set to the second value or the third value indicating the request for the identification information on the first electronic device, the transaction information message further includes transaction information encrypted based on the session key generated based on a random number included in the UWB ranging initiation message, wherein the transaction information includes information for identifying an item purchased through the second electronic device, and wherein the information for identifying the purchased item includes a uniform resource locator (URL) or a string for searching for the purchased item.

10. The first electronic device of claim 9, wherein in case that the request type information is set to the first value indicating the request for card registration, response data in the payment information message includes card information encrypted based on the session key generated based on a random number included in the UWB ranging initiation message, wherein in case that the request type information is set to the second value indicating the request for the identification information on the first electronic device, the response data includes the identification information on the first electronic device encrypted based on the session key, and wherein in case that the request type information is set to the third value indicating the request for the second token, the response data includes the second token encrypted based on the session key.

11. The first electronic device of claim 10, wherein in case that the response data includes the card information, the second token is generated by the second electronic device based on the card information, and wherein in case that the response data includes the second token, the second token is verified for payment processing by the second electronic device.

12. A method of a second electronic device using ultra-wide band (UWB) communication, the method comprising:

transmitting, to a first electronic device, a UWB ranging initiation message including certificate information for the second electronic device;

receiving, from the first electronic device, a UWB ranging response message, the UWB ranging response message including identification information for the first electronic device;

transmitting, to the first electronic device, a transaction information message via a secure channel between the first electronic device and the second electronic device using a session key based on the certificate information for the second electronic device; and receiving, from the first electronic device, a payment information message via the secure channel using the session key, wherein the payment information message includes a token for a payment.

13. The method of claim 12, wherein the transaction information message includes request type information, and wherein the request type information is set to any one of a first value indicating a request for card registration for the payment, a second value indicating a request for the identification information on the first electronic device, or a third value indicating a request for a second token generated based on information on a registered card.

14. The method of claim 13, wherein in case that the request type information is set to the first value indicating the request for card registration, response data in the payment information message includes card information encrypted based on the session key generated based on a random number included in the UWB ranging initiation message, wherein in case that the request type information is set to the second value indicating the request for the identification information on the first electronic device, the response data includes the identification information on the first electronic device encrypted based on the session key, and wherein in case that the request type information is set to the third value indicating the request for the second token, the response data includes the second token encrypted based on the session key.

15. The method of claim 14, wherein in case that the response data includes the card information, the second token is generated based on the card information.

16. The method of claim 14, further comprising, in case that the response data includes the second token, verifying the second token for payment processing.

17. The method of claim 13, wherein in case that the request type information is set to the second value or the third value, the transaction information message further includes transaction information encrypted based on the session key, wherein the transaction information includes information for identifying an item purchased through the second electronic device, and wherein the information for identifying the purchased item includes a uniform resource locator (URL) or a string for searching for the purchased item.

18. A second electronic device using ultra-wide band (UWB) communication, the second electronic device using UWB communication comprising:

a transceiver; and at least one processor connected to the transceiver and configured to:

transmit, to a first electronic device, a UWB ranging initiation message including certificate information for the second electronic device, receive, from the first electronic device, a UWB ranging response message, the UWB ranging response message including identification information on the first electronic device, transmit, to the first electronic device, a transaction information message via a secure channel between the first electronic device and the second electronic device using a session key based on the certificate information for the second electronic device, and receive, from the first electronic device, a payment information message via the secure channel using the session key, wherein the payment information message includes a token for a payment.

19. The second electronic device of claim 18, wherein the transaction information message includes request type information, wherein the request type information is set to any one of a first value indicating a request for card registration for the payment, a second value indicating a request for the identification information on the first electronic device, or a third value indicating a request for a second token generated based on information on a registered card, wherein in case that the request type information is set to the first value indicating the request for card registration, response data in the payment information message includes card information encrypted based on the session key generated based on a random number included in the UWB ranging initiation message, wherein in case that the request type information is set to the second value indicating the request for the identification information on the first electronic device, the response data includes the identification information on the first electronic device encrypted based on the session key, and wherein in case that the request type information is set to the third value indicating the request for the second token, the response data includes the second token encrypted based on the session key.

20. The second electronic device of claim 19, wherein in case that the response data includes the card information, the second token is generated based on the card information.

* * * * *